(12) United States Patent
Kaschmitter et al.

(10) Patent No.: US 7,648,792 B2
(45) Date of Patent: Jan. 19, 2010

(54) DISPOSABLE COMPONENT ON A FUEL CARTRIDGE AND FOR USE WITH A PORTABLE FUEL CELL SYSTEM

(75) Inventors: James L. Kaschmitter, Pleasanton, CA (US); Ian W. Kaye, Livermore, CA (US)

(73) Assignee: UltraCell Corporation, Livermore, CA (US)

( * ) Notice: Subject to any disclaimer, the term of this patent is extended or adjusted under 35 U.S.C. 154(b) by 287 days.

(21) Appl. No.: 11/416,785

(22) Filed: May 2, 2006

(65) Prior Publication Data

US 2006/0257707 A1   Nov. 16, 2006

Related U.S. Application Data

(63) Continuation-in-part of application No. 10/877,766, filed on Jun. 25, 2004.

(60) Provisional application No. 60/677,424, filed on May 2, 2005, provisional application No. 60/682,598, filed on May 18, 2005.

(51) Int. Cl.
  *H01M 2/00* (2006.01)
  *H01M 2/02* (2006.01)
  *B65D 6/00* (2006.01)
  *B65D 8/00* (2006.01)
  *H01M 8/04* (2006.01)
  *H01M 8/12* (2006.01)

(52) U.S. Cl. ............... 429/34; 429/26; 220/4.12; 220/371

(58) Field of Classification Search ............. 429/26, 429/34; 220/4.12, 371
See application file for complete search history.

(56) References Cited

U.S. PATENT DOCUMENTS 4,524,609 A   6/1985   Sharp
4,615,455 A   10/1986  Tansill (Continued)

FOREIGN PATENT DOCUMENTS

DE   19841993   3/2000

(Continued)

OTHER PUBLICATIONS

Fuel Cell Handbook, Oct. 2000, US Department of Energy, Fifth Edition, pp. 8-2, 8-3, and 9-3.*

(Continued)

*Primary Examiner*—Patrick Ryan
*Assistant Examiner*—Eugenia Wang
(74) *Attorney, Agent, or Firm*—Beyer Law Group LLP

(57) ABSTRACT

A portable cartridge that stores a fuel for use with a fuel cell system includes one or more disposable components for use by the fuel cell system. The disposable component may be included on a fuel cartridge, but used by a fuel cell system when the cartridge and a package that includes the system are coupled together. The disposable component may include: an inlet filter that regulates passage of gases and liquids into the fuel system, an outlet filter that cleans fuel cell system exhaust gases, a sensor on the inlet air stream to the fuel cell system; a sensor on the exhaust; a desiccant that sinks moisture from within the fuel cell system package; or a fuel absorbent that soaks fuel between connectors on the fuel cartridge and the fuel cell system.

32 Claims, 11 Drawing Sheets

U.S. PATENT DOCUMENTS

| | | |
|---|---|---|
| 4,889,189 A | 12/1989 | Rozniecki |
| 5,081,095 A | 1/1992 | Bedford et al. |
| 5,525,436 A | 6/1996 | Savinell et al. |
| 5,534,328 A | 7/1996 | Ashmead et al. |
| 5,601,938 A | 2/1997 | Mayer et al. |
| 5,611,214 A | 3/1997 | Wegeng et al. |
| 5,641,585 A | 6/1997 | Lessing et al. |
| 5,716,727 A | 2/1998 | Savinell et al. |
| 5,789,093 A | 8/1998 | Malhi |
| 5,811,062 A | 9/1998 | Wegeng et al. |
| 5,908,141 A | 6/1999 | Teel |
| 5,961,930 A | 10/1999 | Chatterjee et al. |
| 5,961,932 A | 10/1999 | Ghosh et al. |
| 6,077,620 A | 6/2000 | Pettit |
| 6,080,501 A | 6/2000 | Kelley et al. |
| 6,193,501 B1 | 2/2001 | Masel et al. |
| 6,200,536 B1 | 3/2001 | Tonkovich et al. |
| 6,245,214 B1 | 6/2001 | Rehg et al. |
| 6,265,093 B1 | 7/2001 | Surampudi et al. |
| 6,268,077 B1 | 7/2001 | Kelley et al. |
| 6,280,865 B1 | 8/2001 | Eisman et al. |
| 6,312,846 B1 | 11/2001 | Marsh |
| 6,406,808 B1 | 6/2002 | Pratt et al. |
| 6,415,860 B1 | 7/2002 | Kelly et al. |
| 6,423,434 B1 | 7/2002 | Pratt et al. |
| 6,447,945 B1 | 9/2002 | Streckert et al. |
| 6,460,733 B2 | 10/2002 | Acker et al. |
| 6,465,119 B1 | 10/2002 | Koripella et al. |
| 6,470,569 B1 | 10/2002 | Lippert et al. |
| 6,479,920 B1 | 11/2002 | Lal et al. |
| 6,506,513 B1 | 1/2003 | Yonetsu et al. |
| 6,537,506 B1 | 3/2003 | Schwalbe et al. |
| 6,541,676 B1 | 4/2003 | Franz et al. |
| 6,569,553 B1 | 5/2003 | Koripella et al. |
| 6,613,972 B2 | 9/2003 | Cohen et al. |
| 6,630,518 B1 | 10/2003 | Paronen |
| 6,638,654 B2 | 10/2003 | Jankowksi et al. |
| 6,660,421 B2 | 12/2003 | Merin et al. |
| 6,660,423 B2 | 12/2003 | Neutzler et al. |
| 6,673,130 B2 | 1/2004 | Jankowski et al. |
| 6,673,742 B2 | 1/2004 | Abdo et al. |
| 6,677,070 B2 | 1/2004 | Kearl |
| 6,696,195 B2 | 2/2004 | Pavio et al. |
| 6,713,201 B2 | 3/2004 | Bullock et al. |
| 6,727,479 B2 | 4/2004 | Villa et al. |
| 6,739,578 B2 | 5/2004 | Barton et al. |
| 6,746,960 B2 | 6/2004 | Goodman |
| 6,753,036 B2 | 6/2004 | Jankowski et al. |
| 6,766,817 B2 | 7/2004 | da Silva |
| 6,777,118 B2 | 8/2004 | Shioya |
| 6,789,421 B2 | 9/2004 | Gore et al. |
| 6,794,067 B1 | 9/2004 | Acker et al. |
| 6,808,833 B2 | 10/2004 | Johnson |
| 6,815,110 B2 | 11/2004 | Marsh |
| 6,821,666 B2 | 11/2004 | Morse et al. |
| 6,824,905 B2 | 11/2004 | Shioya et al. |
| 6,828,049 B2 | 12/2004 | Bullock et al. |
| 6,835,488 B2 | 12/2004 | Sasahara et al. |
| 6,872,486 B2 | 3/2005 | Srinivasan et al. |
| 6,878,480 B2 | 4/2005 | Ruhl et al. |
| 6,885,298 B2 | 4/2005 | Everson et al. |
| 6,887,596 B2 | 5/2005 | Leban |
| 6,913,998 B2 | 7/2005 | Jankowski et al. |
| 6,916,565 B2 | 7/2005 | Shioya |
| 6,921,593 B2 | 7/2005 | Pan et al. |
| 6,921,603 B2 | 7/2005 | Morse et al. |
| 6,924,054 B2 | 8/2005 | Prasad et al. |
| 6,926,852 B2 | 8/2005 | Satou et al. |
| 6,939,632 B2 | 9/2005 | Arana et al. |
| 6,955,863 B2 | 10/2005 | Bean et al. |
| 6,960,235 B2 | 11/2005 | Morse et al. |
| 6,960,403 B2 | 11/2005 | Morse et al. |
| 6,994,932 B2 | 2/2006 | Kinkelaar et al. |
| 6,998,185 B2 | 2/2006 | Gore et al. |
| 7,004,207 B2 | 2/2006 | Finkelshtain et al. |
| 7,010,972 B2 | 3/2006 | Kaye et al. |
| 7,059,582 B2 | 6/2006 | Adams et al. |
| 7,074,511 B2 | 7/2006 | Becerra et al. |
| 7,077,643 B2 | 7/2006 | Holladay et al. |
| 7,093,623 B2 | 8/2006 | Soucy |
| 7,099,018 B2 | 8/2006 | Adams |
| 7,105,245 B2 | 9/2006 | Ohlsen et al. |
| 7,115,335 B2 | 10/2006 | Eggum |
| 7,122,261 B2 | 10/2006 | Morse et al. |
| 7,128,106 B2 | 10/2006 | Becerra et al. |
| 7,156,131 B2 | 1/2007 | Adams et al. |
| 7,158,375 B2 | 1/2007 | Kornmayer |
| 7,159,130 B2 | 1/2007 | Koo |
| 7,169,489 B2 | 1/2007 | Redmond |
| 7,172,825 B2 | 2/2007 | Adams et al. |
| 7,241,523 B1 | 7/2007 | Arikara et al. |
| 2001/0028965 A1 | 10/2001 | Boneberg et al. |
| 2001/0029974 A1 | 10/2001 | Cohen et al. |
| 2001/0045364 A1 | 11/2001 | Hockaday et al. |
| 2002/0012825 A1 | 1/2002 | Sasahara et al. |
| 2002/0018925 A1 | 2/2002 | Merin Celemin et al. |
| 2002/0045082 A1 | 4/2002 | Marsh |
| 2002/0048698 A1* | 4/2002 | Fronk .......................... 429/19 |
| 2002/0076599 A1 | 6/2002 | Neutzler et al. |
| 2002/0081468 A1 | 6/2002 | Shioya |
| 2002/0094462 A1 | 7/2002 | Shioya et al. |
| 2002/0098119 A1 | 7/2002 | Goodman |
| 2002/0106540 A1 | 8/2002 | Shioya |
| 2002/0114984 A1 | 8/2002 | Edlund et al. |
| 2002/0127141 A1 | 9/2002 | Acker |
| 2002/0127451 A1 | 9/2002 | Cao et al. |
| 2002/0131915 A1 | 9/2002 | Shore et al. |
| 2002/0132156 A1 | 9/2002 | Ruhl et al. |
| 2002/0147107 A1 | 10/2002 | Abdo et al. |
| 2002/0150804 A1 | 10/2002 | Srinivasan et al. |
| 2002/0154915 A1 | 10/2002 | Bullock et al. |
| 2002/0155335 A1 | 10/2002 | Kearl |
| 2002/0182459 A1 | 12/2002 | Hockaday et al. |
| 2002/0192537 A1 | 12/2002 | Ren |
| 2002/0197522 A1 | 12/2002 | Lawrence et al. |
| 2003/0006668 A1 | 1/2003 | Lal et al. |
| 2003/0027022 A1 | 2/2003 | Arana et al. |
| 2003/0031910 A1 | 2/2003 | Satou et al. |
| 2003/0031913 A1 | 2/2003 | Pavio et al. |
| 2003/0041899 A1 | 3/2003 | Frank |
| 2003/0057199 A1 | 3/2003 | Villa et al. |
| 2003/0064258 A1 | 4/2003 | Pan et al. |
| 2003/0077495 A1 | 4/2003 | Scartozzi et al. |
| 2003/0082416 A1 | 5/2003 | Bullock et al. |
| 2003/0082422 A1* | 5/2003 | Koschany .................... 429/26 |
| 2003/0082426 A1 | 5/2003 | Bullock et al. |
| 2003/0082427 A1 | 5/2003 | Prasad et al. |
| 2003/0091502 A1 | 5/2003 | Holladay et al. |
| 2003/0129464 A1 | 7/2003 | Becerra et al. |
| 2003/0131663 A1 | 7/2003 | Gore et al. |
| 2003/0134162 A1 | 7/2003 | Gore et al. |
| 2003/0136453 A1 | 7/2003 | Johnson |
| 2003/0138676 A1 | 7/2003 | Leban |
| 2003/0138679 A1 | 7/2003 | Prased et al. |
| 2003/0143444 A1 | 7/2003 | Liu et al. |
| 2003/0157389 A1 | 8/2003 | Kornmayer |
| 2003/0194363 A1 | 10/2003 | Koripella |
| 2003/0235731 A1* | 12/2003 | Haltiner et al. ................ 429/24 |
| 2004/0001989 A1 | 1/2004 | Kinkelaar et al. |
| 2004/0009381 A1 | 1/2004 | Sakai et al. |
| 2004/0013927 A1 | 1/2004 | Lawrence et al. |
| 2004/0043273 A1 | 3/2004 | Jankowksi et al. |
| 2004/0048128 A1 | 3/2004 | Jankowksi et al. |
| 2004/0072046 A1* | 4/2004 | Schmidt ...................... 429/34 |

| | | |
|---|---|---|
| 2004/0081884 A1 | 4/2004 | Bean et al. |
| 2004/0086755 A1 | 5/2004 | Kalal |
| 2004/0096714 A1 | 5/2004 | Bette et al. |
| 2004/0096721 A1 | 5/2004 | Ohlsen et al. |
| 2004/0146769 A1 | 7/2004 | Birschbach |
| 2004/0151962 A1 | 8/2004 | Adams |
| 2004/0166395 A1 | 8/2004 | Jankowski et al. |
| 2004/0173615 A1 | 9/2004 | Goodman |
| 2004/0175598 A1 | 9/2004 | Bliven et al. |
| 2004/0175600 A1 | 9/2004 | Arthur et al. |
| 2004/0191588 A1 | 9/2004 | Eshraghi et al. |
| 2004/0209142 A1 | 10/2004 | Becerra et al. |
| 2004/0211054 A1 | 10/2004 | Morse et al. |
| 2004/0229101 A1 | 11/2004 | Davis |
| 2004/0234826 A1 | 11/2004 | Stuhler |
| 2004/0241521 A1 | 12/2004 | Finkelshtain et al. |
| 2004/0253500 A1 | 12/2004 | Bourilkov et al. |
| 2004/0265650 A1 | 12/2004 | Koo |
| 2004/0265652 A1 | 12/2004 | Soucy |
| 2005/0008908 A1 | 1/2005 | Kaye et al. |
| 2005/0008909 A1 | 1/2005 | Kaye et al. |
| 2005/0011125 A1 | 1/2005 | Kaye et al. |
| 2005/0014040 A1 | 1/2005 | Kaye |
| 2005/0014041 A1 | 1/2005 | Becerra et al. |
| 2005/0014059 A1 | 1/2005 | Kaye |
| 2005/0022883 A1 | 2/2005 | Adams et al. |
| 2005/0023236 A1 | 2/2005 | Adams et al. |
| 2005/0058873 A1* | 3/2005 | Arthur et al. ............ 429/34 |
| 2005/0058879 A1 | 3/2005 | Guay |
| 2005/0074643 A1 | 4/2005 | Adams et al. |
| 2005/0074656 A1 | 4/2005 | Koyama et al. |
| 2005/0095500 A1 | 5/2005 | Corless et al. |
| 2005/0115637 A1 | 6/2005 | Adams et al. |
| 2005/0115882 A1 | 6/2005 | Curello et al. |
| 2005/0116190 A1 | 6/2005 | Adams et al. |
| 2005/0118468 A1 | 6/2005 | Adams et al. |
| 2005/0147864 A1 | 7/2005 | Eggum |
| 2005/0155668 A1 | 7/2005 | Finkelshtain et al. |
| 2006/0008687 A1 | 1/2006 | Kaye et al. |
| 2006/0014069 A1 | 1/2006 | Kaye et al. |
| 2006/0014070 A1 | 1/2006 | Kaye et al. |
| 2006/0021882 A1 | 2/2006 | Kaye et al. |
| 2006/0024543 A1 | 2/2006 | Kaye et al. |
| 2006/0024553 A1 | 2/2006 | Kaye et al. |
| 2006/0024554 A1 | 2/2006 | Kaye et al. |
| 2006/0070891 A1 | 4/2006 | Kaye |
| 2006/0071009 A1 | 4/2006 | Kaye |
| 2006/0073365 A1 | 4/2006 | Kaye |

FOREIGN PATENT DOCUMENTS

| | | |
|---|---|---|
| JP | 2002-161997 | 7/2002 |
| JP | 2003017102 | 1/2003 |
| JP | 2003-049996 | 2/2003 |
| KR | 2005041265 | 5/2005 |
| WO | WO 00/45457 | 8/2000 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 03/012902 | 2/2003 |
| WO | WO 2004/030805 | 4/2004 |

OTHER PUBLICATIONS

Fuel Cell Handbook, Oct. 2000, US Department of Energy, Fifth Edition, pp. 1-1 to 1-8.*
Bostaph et al., "1W Direct Methanol Fuel Cell System as a Desktop Charger", Oct. 14, 2002, Motorola Labs, Tempe, AZ.
Kaschmitter et al., "Micro-Fabricated Methanol/Water Reformers for Small PEM Fuel Cell Systems", Jul. 21-24, 2003, 8$^{th}$ Electrochemical Power Sources R&D Symposium, Portsmouth, VA.
Lee et al., "Removal of Carbon Monoxide from Reformate for Polymer Electrolyte Fuel Cell Application", Nov. 16-19, 1998, 1998 Fuel Cell Seminar, Palm Springs, CA.
Li et al., "The CO Poisoning Effect in PEMFCs Operational at Temperatures up to 200° C", 2003, Journal of The Electrochemical Society, 150 (12) A1599-A1605.
Myers et al., "Alternative Water-Gas Shift Catalysts", Jun. 7-8, 2000, 2000 Annual National Laboratory R&D Meeting, DOE Fuel Cells for Transportation Program, Argonne National Laboratory.
Palo et al., "Development of a Soldier-Portable Fuel Cell Power System, Part I: A Bread-Board Methanol Fuel Processor", 2002, Journal of Power Sources 108 (2002) 28-34.
Pattekar et al., "Novel Microfluidic Interconnectors for High Temperature and Pressure Applications", 2003, Journal of Micromechanics and Microengineering, 13, 337-345.
Prater et al., "Systematic Examination of a Direct Methanol-Hydrogen Peroxide Fuel Cell", Sep. 22, 2001, Swift Enterprises, Ltd., Lafayette, IN.
Ruettinger et al., "A New Generation of Water Gas Shift Catalysts for Fuel Cell Applications", 2003, Journal of Power Sources, 118, 61-65.
Tasic et al., "Multilayer Ceramic Processing of Microreactor Systems", Oct. 14, 2002, Motorola Labs, Tempe, AZ.
Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.
Tomašić et al., "Development of the Structured Catalysts for the Exhaust Gas Treatment", 2001, Chem. Biochem. Eng. Q. 15 (3), 109-115.
Wan et al., "Catalyst Preparation: Catalytic Converter", Feb. 19, 2003, www.insightcentral.net/encatalytic.html.
Zalc et al., "Are Noble Metal-Based Water-Gas Shift Catalysts Practical for Automotive Fuel Processing?", 2002, Journal of Catalysis, 206, 169-171.
Office Action dated Jan. 7, 2008 in U.S. Appl. No. 11/228,693.
Office Action dated Mar. 8, 2005 in U.S. Appl. No. 10/877,766.
Office Action dated Aug. 11, 2005 in U.S. Appl. No. 10/877,766.
Office Action dated Mar. 8, 2006 in U.S. Appl. No. 10/877,766.
Office Action dated Aug. 24, 2006 in U.S. Appl. No. 10/877,766.
Office Action dated Feb. 27, 2007 in U.S. Appl. No. 10/877,766.
Office Action dated Jun. 14, 2007 in U.S. Appl. No. 10/877,766.
T.M. Floyd et al., "Liquid-Phase and Multi-Phase Microreactors for Chemical Synthesis", Jun. 1999, Massachusetts Institute of Technology, Cambridge, MA.
Office Action dated Aug. 29, 2006 in U.S. Appl. No. 11/229,049.
Office Action dated Dec. 4, 2006 in U.S. Appl. No. 11/229,049.
S. Ahmed et al., "Catalytic Partial Oxidation Reforming of Hydrocarbon Fuels", Nov. 16-19, 1998, 1998 Fuel Cell Seminar, Palm Springs, CA.
A.R. Boccaccini et al., "Electrophoretic Deposition of Nanoceramic Particles onto Electrically Conducting Fibre Fabrics", Sep. 21-24, 1998, 43$^{rd}$ International Scientific Colloquium, Technical University of Ilmenau.
K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.
M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.
S. Ehrenberg et al., "One Piece Bi-Polar (OPB) Plate with Cold Plate Cooling", Dec. 13, 2002, Session PEM R&D II (2A), Dais Analytic—Rogers.
A.J. Franz et al., "High Temperature Gas Phase Catalytic and Membrane Reactors", Jun. 1999, Massachusetts Institute of Technology, Cambridge, MA.
J.D. Holladay et al., "Miniature Fuel Processors for Portable Fuel Cell Power Supplies", Nov. 26, 2002, Battelle Pacific Northwest Division, Richland, WA.
S.W. Janson et al., "MEMS, Microengineering and Aerospace Systems", 1999, The American Institute of Aeronautics and Astronautics, Inc.
K. Keegan et al., "Analysis for a Planar Solid Oxide Fuel Cell Based Automotive Auxiliary Power Unit", Mar. 4-7, 2002, SAE 2002 World Congress, Detroit, MI.

K. Kempa et al., "Photonic Crystals Based on Periodic Arrays of Aligned Carbon Nanotubes", Oct. 3, 2002, Nano Letters 2003, vol. 3. No. 1, 13-18.

R. Kumar et al., "Solid Oxide Fuel Cell Research at Argonne National Laboratory", Mar. 29-30, 2001, $2^{nd}$ Solid Sate Energy Conversion Alliance Workshop, Arlington, VA.

A. Pattekar et al., "A Microreactor for In-situ Hydrogen Production by Catalytic Methanol Reforming", May 27-30, 2001, Proceedings of the $5^{th}$ International Conference on Microreaction Technology.

O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.

R.F. Savinell et al., "High Temperature Polymer Electrolyte for PEM Fuel Cells", Sep. 4, 2002, Department of Chemical Engineering, Case Western Reserve University.

R. Srinivasan et al., "Micromachined Reactors for Catalytic Partial Oxidation Reactions", Nov. 1997, AIChe Journal, vol. 43, No. 11, 3059-3069.

S. Swartz et al., "Ceria-Based Water-Gas-Shift Catalysts", Aug. 1, 2003, NexTech Materials, Ltd., Wolrthington, OH.

J. Zizelman et al., "Solid-Oxide Fuel Cell Auxiliary Power Unit: A Paradigm Shift in Electric Supply for Transportation", undated, Delphi Automotive Systems.

"Methanol-Powered Laptops—Cleared for Take-Off", www.silicon.com, Oct. 7, 2002.

Melissa Funk, "Methanol Fuel Quality Specification Study for Proton Exchange Membrane Fuel Cells, Final Report", XCELLSIS, Feb. 2002, 65 pages.

Dr. Detlef zur Megede et al., "MFCA Research Document, Complete", Methanol Fuel Cell Alliance, Sep. 2000, 242 pages.

Office Action dated Feb. 5, 2008 from U.S. Appl. No. 10/877,766.

International Search Report dated Apr. 8, 2008 from PCT Application No. PCT/US05/46578.

Written Opinion dated Apr. 8, 2008 from PCT Application No. PCT/US05/46578.

International Search Report dated Apr. 9, 2008 from PCT Application No. PCT/US06/16876.

Written Opinion dated Apr. 9, 2008 from PCT Application No. PCT/US06/16876.

Office Action dated Jul. 30, 2008 from U.S. Appl. No. 10/877,766.

Office Action dated Apr. 16, 2009 in U.S. Appl. No. 11/229,092.

Office Action dated Apr. 14, 2009 in U.S. Appl. No. 11/228,764.

Office Action dated Apr. 14, 2009 in U.S. Appl. No. 11/229,094.

Office Action dated Apr. 2, 2009 in U.S. Appl. No. 11/228,906.

Office Action dated Mar. 5, 2009 in U.S. Appl. No. 11/228,794.

Office Action dated Feb. 26, 2009 in U.S. Appl. No. 11/229,051.

Office Action dated Jan. 30, 2009 in U.S. Appl. No. 10/877,766.

Office Action dated Feb. 5, 2008 in U.S. Appl. No. 10/877,766.

Office Action dated Jul. 30, 2008 in U.S. Appl. No. 10/877,766.

Chinese Office Action dated Aug. 29, 2008 from CN Patent Application No. 2004800246307.

Office Action dated Oct. 7, 2008 from U.S. Appl. No. 11/228,906.

Office Action dated Jun. 18, 2009 in U.S. Appl. No. 11/228,955.

* cited by examiner

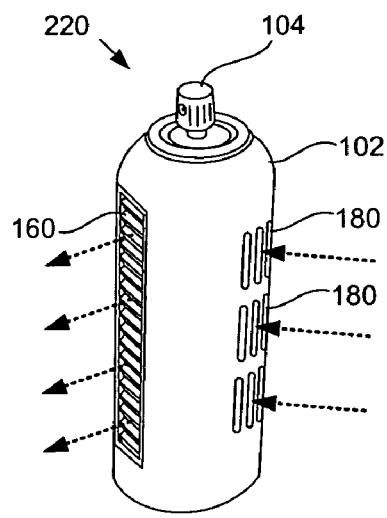
FIG. 4A
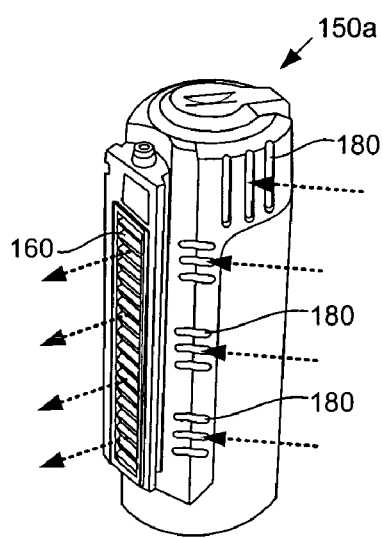 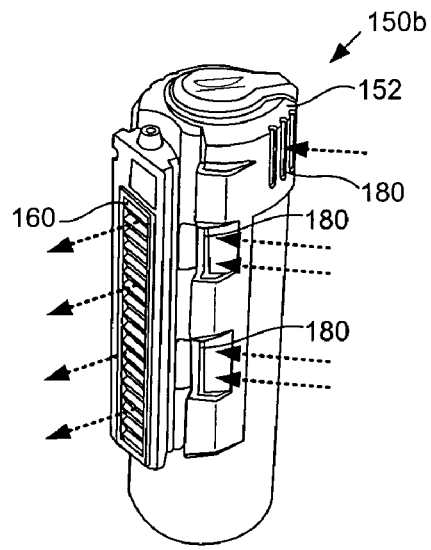
FIG. 4B  FIG. 4C

DISPOSABLE COMPONENT ON A FUEL CARTRIDGE AND FOR USE WITH A PORTABLE FUEL CELL SYSTEM

CROSS-REFERENCE TO RELATED APPLICATIONS

This application a) claims priority under 35 U.S.C. §119(e) to: i) U.S. Provisional Patent Application No. 60/677,424 filed on May 2, 2005 entitled "Micro Fuel Cell Fuel Cartridge Apparatus", and ii) U.S. Provisional Patent Application No. 60/682,598 filed on May 18, 2005 entitled "Fuel Storage Devices for Use with Micro Fuel Cells".

FIELD OF THE INVENTION

The present invention relates to fuel cell technology. In particular, the invention relates to portable fuel cartridges that store a fuel, allow transportation of the fuel, and provide disposable components for use by a portable fuel cell system.

BACKGROUND OF THE INVENTION

A fuel cell electrochemically combines hydrogen and oxygen to produce electricity. The ambient air readily supplies oxygen; hydrogen provision, however, calls for a working supply. The hydrogen supply may include a direct hydrogen supply or a 'reformed' hydrogen supply. A direct hydrogen supply outputs hydrogen, such as compressed hydrogen in a pressurized container or a solid-hydrogen storage system. A reformed hydrogen supply processes a fuel (or fuel source) to produce the hydrogen.

Consumer electronics devices and portable electrical power applications currently rely on lithium ion and other battery technologies. Portable fuel cell systems that generate electrical energy for portable electronics devices promise extended usage sessions, but are not yet commercially available. One current but unmet goal is to produce laptop computers with an integrated fuel cell system.

Most stationary and industrial scale fuel cell systems rely on one or more disposable components, such as an air or fuel filter whose performance degrades over time and requires eventual servicing. Replacing these filters is seen as trivial (by a system owner) for an industrial scale system relative to power output by the system.

Portable fuel cell systems currently propose to also burden consumers to service their fuel cell system and its disposable components. However, portable fuel cell systems suffer from several practical complications that their industrial scale predecessors do not: maintenance diligence cannot be counted on when the number of portable users is exponentially high, and maintenance diligence may be impractical when portable fuel cell systems are carried to an inaccessible location such as remote military applications (e.g., in the desert). These servicing complications burden commercial adoption of portable fuel cell systems and threaten early confidence in the technology. Based on the foregoing, new solutions handling disposable components in a portable fuel cell system are needed.

SUMMARY OF THE INVENTION

The present invention provides a portable cartridge that stores a fuel for use with a fuel cell system and that includes one or more disposable components for use by the fuel cell system. Replacing a fuel cartridge, e.g., when fuel is depleted from the current cartridge, also then services the disposable component for the fuel cell system.

Thus, the disposable component is included on a fuel cartridge—but used by a fuel cell system when the cartridge and a package that includes the system are coupled together. The disposable component may include: an inlet filter that regulates passage of gases and liquids into the fuel system, an outlet filter that cleans fuel cell system exhaust gases, a sensor on the inlet air stream to the fuel cell system; a sensor on the exhaust; a desiccant that sinks moisture from within the fuel cell system package; or a fuel absorbent that soaks fuel between connectors on the fuel cartridge and the fuel cell system. A cartridge may include multiple disposable components.

In one aspect, the invention relates to a portable cartridge for storing a fuel for use in a fuel cell system. The portable fuel cartridge includes a housing, a volume internal to the housing for storing the fuel, and a connector configured to permit transfer of the fuel between the internal volume and the portable fuel cell system. The portable fuel cartridge also includes an air filter configured to intercept air before the portable fuel cell system receives the air.

In another aspect, the invention relates to a portable fuel cell system for producing electrical energy. The portable fuel cell system includes a portable fuel cell system package that includes a fuel cell; and a portable fuel cartridge including an air filter configured to intercept air before the portable fuel cell system package receives the air.

In yet another aspect, the invention relates to a method of filtering air used in a portable fuel cell system. The method includes disposing an air filter on a portable fuel cartridge that stores a fuel for use in the portable fuel cell system. The method also includes passing air through the air filter on the portable fuel cartridge to produce filtered air. The method further includes providing the filtered air from the air filter on the portable fuel cartridge to the fuel cell system. Furthermore the air filter may be divided into one or more sections, each section optimized to filter a certain particle size or impurity based on the direction in which the air is to be directed. For example, cooling airflow needs less stringent filtration than process airflow fed into a fuel cell, fuel processor or other chemical reactor.

In still another aspect, the invention relates to a portable fuel cartridge for storing a fuel for use in a fuel cell system. The cartridge includes an exhaust filter configured to intercept gaseous exhaust output by the portable fuel cell system.

In another aspect, the invention relates to a portable fuel cartridge that includes a desiccant configured to absorb moisture internal to a portable fuel cell system package that includes a portable fuel cell system when the portable fuel cartridge is coupled to the portable fuel cell system package.

In yet another aspect, the invention relates to a portable fuel cartridge that includes a sensor configured to detect a parameter or event for: a) an inlet air stream provided to a portable package, that includes a portable fuel cell system, when the portable fuel cartridge is coupled to the portable fuel cell system package; or b) an exhaust emitted from the portable fuel cell system package.

In still another aspect, the invention relates to a portable fuel cartridge that includes: a connector configured to permit transfer of fuel between an internal volume and a portable fuel cell system when the portable fuel cartridge is coupled to a portable package that includes the fuel cell system, and includes a fuel absorbent disposed adjacent to a fuel connector.

In still another aspect, the invention relates to a portable fuel cartridge with a viewing window that includes a transparent portion and that is configured to permit a user to see a current fuel level inside the portable fuel cartridge.

For each of these cartridges, the inventors have contemplated both: a) a fuel cartridge; and b) a fuel cell system coupled with a fuel cartridge including the disposable component.

These and other features of the present invention will be described in the following description of the invention and associated figures.

BRIEF DESCRIPTION OF THE DRAWINGS

FIG. 4A illustrates a cartridge that includes an air filter in accordance with another embodiment of the present invention.

FIGS. 4B and 4C show airflow through the cartridges of FIGS. 2B and 2C.

DETAILED DESCRIPTION OF THE PREFERRED EMBODIMENTS

Figure 1:
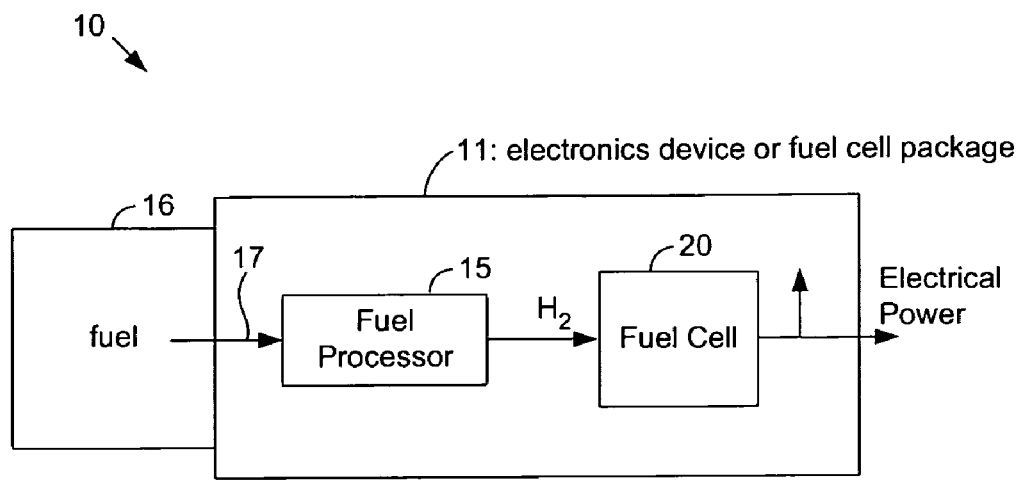
FIG. 1 illustrates an exemplary RMFC fuel cell system for producing electrical energy in accordance with one embodiment of the present invention.

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A fuel cartridge of the present invention includes at least one disposable component used by a fuel cell system that the cartridge provides fuel to. The disposable component may degrade over time, and the degradation may affect fuel cell system performance. Placing the disposable component on the cartridge—as opposed to including it with a fuel cell system package—permits the disposable component to be changed or renewed when a cartridge is replaced. Since fuel cartridges intended for use with portable fuel cell systems often include a limited volume of fuel, a user eventually replaces a used or depleted fuel cartridge at some point, which is typically a small fraction of the expected lifetime of the fuel cell system. This enables fuel cell system maintenance with no added effort to a user or consumer.

In one embodiment, a portable fuel cartridge is intended for a single use and is disposable. In this case, a user throws away the disposable cartridge after usage, along with each disposable component on the cartridge. In another embodiment, a portable fuel cartridge is intended for refilling and reuse. In this case, the disposable component may be refreshed or replaced when the cartridge is refilled with fuel.

One optional disposable component is an air filter that cleans air entering a fuel cell system package. In this case, the fuel cartridge attaches or couples to the portable fuel cell system package such that inlet air provided to the fuel cell system passes through the fuel cartridge filter before entering the fuel cell system. For example, air used for cooling a fuel cell or fuel processor in the package may be first filtered using the fuel cartridge filter. Alternatively, the filtered air may be provided to the fuel cell for electrochemical reaction and electrical energy production. In addition, the air may be used in the fuel processor (e.g., by a chemical burner for heat generation and/or in a reformer for fuel conversion to hydrogen). Replacing the portable fuel cartridge with a new cartridge also replaces the inlet air filter, which avoids having to service an air filter on the fuel cell system package. This is particularly useful for portable fuel cell system used by the military in the desert or other locations that introduce significant amounts of sand or other small particulates into the incoming air stream.

In another disposable component embodiment, a portable fuel cartridge includes exhaust filter where one or more filters are disposed to intercept exhaust from the fuel cell system package before releasing the exhaust into the ambient environment. The exhaust filter cleanses the exhaust of one or more chemical byproducts released from a fuel processor and/or fuel cell.

Another optional disposable component is an absorbent material included near a connector on the fuel cartridge. The absorbent material soaks any fuel that inadvertently leaks from the connector or a mating connector on the fuel cell system, e.g., during coupling or decoupling of the connector and mating connector.

A portable fuel cartridge may also include one or more desiccants configured to absorb moisture from within a fuel cell system package. The desiccants reduce moisture aggregation on components internal to the package, such as the fuel cell, both during usage and when not in use. Desiccant inclusion on a fuel cartridge is particularly useful for portable fuel cell systems employed in humid environments, or for portable systems that shut off for long durations of time but are exposed to conditions that allow moisture to creep inside a portable package.

Yet another optional disposable component is a sensor that detects a parameter relevant to the fuel cell system or usage of a fuel cell system. The sensor may be disposed on the inlet air stream or the exhaust. For example, a carbon monoxide sensor may be disposed on the inlet air stream to monitor carbon monoxide levels in the ambient environment. When the carbon monoxide in the incoming air stream surpasses predetermined threshold, the sensor detects this information and permits the fuel cell systems to react (e.g., shut down).

Fuel Cell Systems

Before further description of disposable components suitable for inclusion with a portable fuel cartridge in accordance with the present invention, exemplary fuel cell systems will first be discussed to provide fuel cell system context for the disposable components.

Cartridges described herein are suitable for use with a wide array of fuel cell systems. A micro fuel cell system generates dc voltage, and may be used in numerous portable applications. For example, electrical energy generated by a micro fuel cell may power a notebook computer or a portable electrical generator carried by military personnel. In one embodiment, the present invention provides 'small' fuel cells that are configured to output less than 200 watts of power (net or total). Fuel cells of this size are also referred to as 'micro fuel cells'. In one embodiment, the fuel cell is configured to controllably generate and output from about 1 milliwatt to about 200 Watts. In another embodiment, the fuel cell generates from about 5 Watts to about 60 Watts. One specific portable fuel cell package produces about 20 Watts or about 45 Watts, depending on the number of cells in the stack.

Cartridges of the present invention are also suitable for use with a variety of fuel cell systems types. Suitable system architectures include direct methanol fuel cell (DMFC) systems, reformed methanol fuel cell (RMFC) systems, solid oxide fuel cell (SOFC) systems, sodium borohydride fuel cell systems, formic acid fuel cells and reformed diesel PEM stack systems etc. All these fuel cell system types rely on a cartridge for fuel storage and transportation.

FIG. 1 illustrates an RMFC fuel cell system 10 for producing electrical energy in accordance with one embodiment of the present invention. System 10 comprises cartridge 16, fuel processor 15 and fuel cell 20. Fuel processor 15 processes a fuel 17 to produce hydrogen for fuel cell 20. Fuel cell system 10 may be a stand-alone system, which is a single package 11 that produces power as long as it has access to a) oxygen and b) hydrogen or a hydrogen fuel source such as fuel 17.

Cartridge 16, which is interchangeably referred to herein as a 'storage device', stores a fuel 17. Cartridge 16 may comprise a refillable and/or disposable fuel cartridge; either design permits recharging capability for system 10 or an electronics device 11 by swapping a depleted cartridge 16 for one with fuel. As will be described below, this also replenishes one or more disposable components included with cartridge 16 to improve operation of a fuel cell system.

A connector on cartridge 16 interfaces with a mating connector on electronics device 11 to permit fuel to be withdrawn from cartridge 16. In one embodiment, cartridge connector includes a contact valve that interfaces with mating plumbing on device 11 when the cartridge 16 detachably couples to a housing for device 11.

In one embodiment, cartridge 16 includes a bladder that contains the fuel and conforms to the volume of fuel in the bladder. An outer rigid housing or housing assembly provides mechanical protection for the bladder. The bladder and housing permit a wide range of portable and non-portable cartridge sizes with fuel capacities ranging from a few milliliters to several liters. In another embodiment, the cartridge is vented and includes a small hole, single direction flow valve, hydrophobic filter, or other aperture to allow air to enter the fuel cartridge as fuel 17 is consumed and displaced from the cartridge. This type of cartridge allows for "orientation" independent operation since pressure in the bladder remains relatively constant as fuel is displaced.

A pressure source moves the fuel 17 from cartridge 16 to fuel processor 15. In one embodiment, a pump, such as a diaphragm pump, draws fuel 17 from cartridge 16. A controller then provides control signals to the pump to regulate fuel flow. Cartridge 16 may also be pressurized with a pressure source such as foam or a propellant internal to the housing that pushes on the bladder (e.g., propane, compressed nitrogen gas or compressed oxygen from the system 10). In this case, system 10 then employs a control valve to regulate flow, etc. If system 10 is load following, then a control system meters fuel 17 flow to deliver fuel to processor 15 at a flow rate determined by a required power level output of fuel cell 20 and regulates a controlled item (e.g., the pump or valve) accordingly. Other pressure sources may be used to move fuel 17 from cartridge 16. For example, some cartridge designs suitable for use herein include a wick that moves a liquid fuel from locations within a fuel cartridge to a cartridge exit.

Fuel 17 acts as a carrier for hydrogen and can be processed or manipulated to separate hydrogen. As the terms are used herein, 'fuel', 'fuel source' and 'hydrogen fuel source' are interchangeable and all refer to any fluid (liquid or gas) that can be manipulated to separate hydrogen. Fuel 17 may include any hydrogen bearing fuel stream, hydrocarbon fuel or other source of hydrogen such as ammonia. Currently available hydrocarbon fuels 17 suitable for use with the present invention include gasoline, $C_1$ to $C_4$ hydrocarbons, their oxygenated analogues and/or their combinations, for example. Other fuel sources may be used with a fuel cell package of the present invention, such as sodium borohydride. Several hydrocarbon and ammonia products may also be used. Liquid fuels 17 offer high energy densities and the ability to be readily stored and shipped.

Fuel 17 may be stored as a fuel mixture. When the fuel processor 15 comprises a steam reformer, for example, storage device 16 includes a fuel mixture of a hydrocarbon fuel and water. Hydrocarbon fuel/water mixtures are frequently represented as a percentage of fuel in water. In one embodiment, fuel 17 comprises methanol or ethanol concentrations in water in the range of 1-99.9%. Other liquid fuels such as butane, propane, gasoline, military grade "JP8", etc. may also be contained in storage device 16 with concentrations in water from 5-100%. In a specific embodiment, fuel 17 comprises 67% methanol by volume.

Cartridge 16 mechanically and detachably couples to device 11, which includes fuel processor 15 and fuel cell 20. In one embodiment, device 11 is a portable fuel cell system package that includes a fuel cell system and one or more DC outputs. Such a portable package operates as an independent and portable power source that provides electrical energy as long as the package has access to fuel 17. Military personnel, who carry an array of electronics devices and perform extended operations, benefit from such a portable and replenishable power supply. In another embodiment, device 11 includes an electronics device that consumes electrical energy generated by fuel cell 20. Examples include laptop computers, handheld computers and PDAs, cell phones, lights such as flashlights, radios, etc. The device 11 may export the energy to another electronics device, use it internally, and combinations thereof. Fuel cells described herein are useful to power a wide array of electronics devices, and in general, the present invention is not limited by what device couples to cartridge 16 or receives fuel from cartridge 16.

Fuel processor 15 processes fuel 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer, which is a catalytic device that converts a liquid or gaseous hydrocarbon fuel 17 into hydrogen and carbon dioxide. Various types of reformers are suitable for use in fuel cell system 10; these include steam reformers, auto thermal reformers (ATR) and catalytic partial oxidizers (CPOX) for example.

Fuel cell 20 electrochemically converts hydrogen and oxygen to water, generating electrical energy (and sometimes heat) in the process. Ambient air readily supplies oxygen. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications such as consumer electronics. A PEM fuel cell comprises a membrane electrode assembly (MEA) that carries out the electrical energy generating an electrochemical reaction. The MEA includes a hydrogen catalyst, an oxygen catalyst, and an ion conductive membrane that a) selectively conducts protons and b) electrically isolates the hydrogen catalyst from the oxygen catalyst. A hydrogen gas distribution layer may also be included; it contains the hydrogen catalyst and allows the diffusion of hydrogen therethrough. An oxygen gas distribution layer contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. In one embodiment, each bi-polar plate is formed from a single sheet of metal that includes channel fields on opposite surfaces of the metal sheet. The single bi-polar plate thus dually distributes hydrogen and oxygen: one channel field distributes hydrogen while a channel field on the opposite surface distributes oxygen. Multiple bi-polar plates can be stacked to produce the 'fuel cell stack' in which a membrane electrode assembly is disposed between each pair of adjacent bi-polar plates. Alternatively, the cells may laid out in a planar fashion (strip cell), or a combination of small stacks arranged in a planar fashion. Those skilled in the art appreciate that the basic individual cell layout can be packaged in several different formats (tube bundle, strip cell, planar, stack etc.)

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder thinly coated onto a carbon paper or cloth. Many designs employ a rough and porous catalyst to increase surface area of the platinum exposed to the hydrogen and oxygen.

While the present invention has primarily been discussed so far with respect to PEM fuel cells, it is understood that the present invention may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may be useable with fuel cartridges described herein. Other such fuel cell architectures include alkaline and molten carbonate fuel cells, for example.

Fuel Cartridges

Figure 2A:
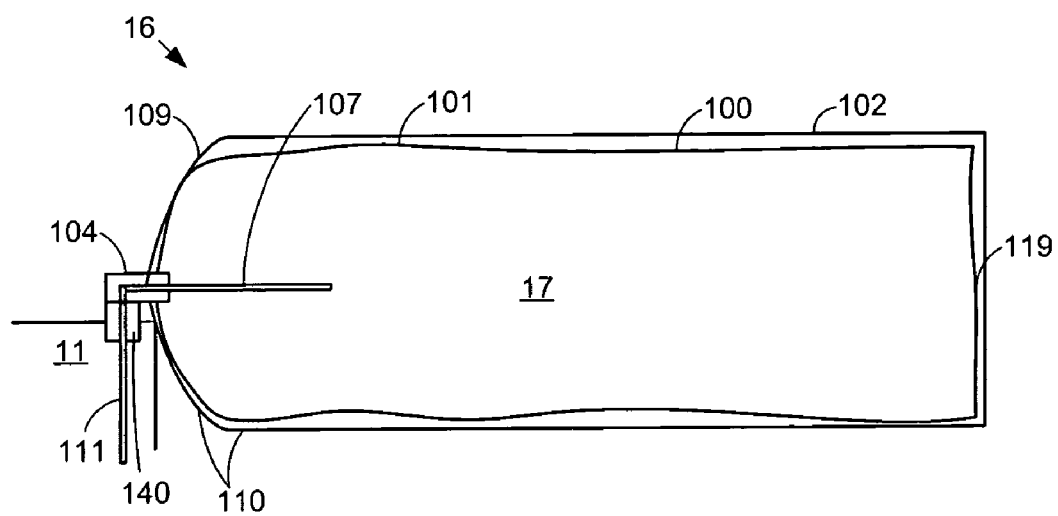
FIG. 2A shows a simplified cross section of a cartridge in accordance with one embodiment of the present invention.
Figure 2B:
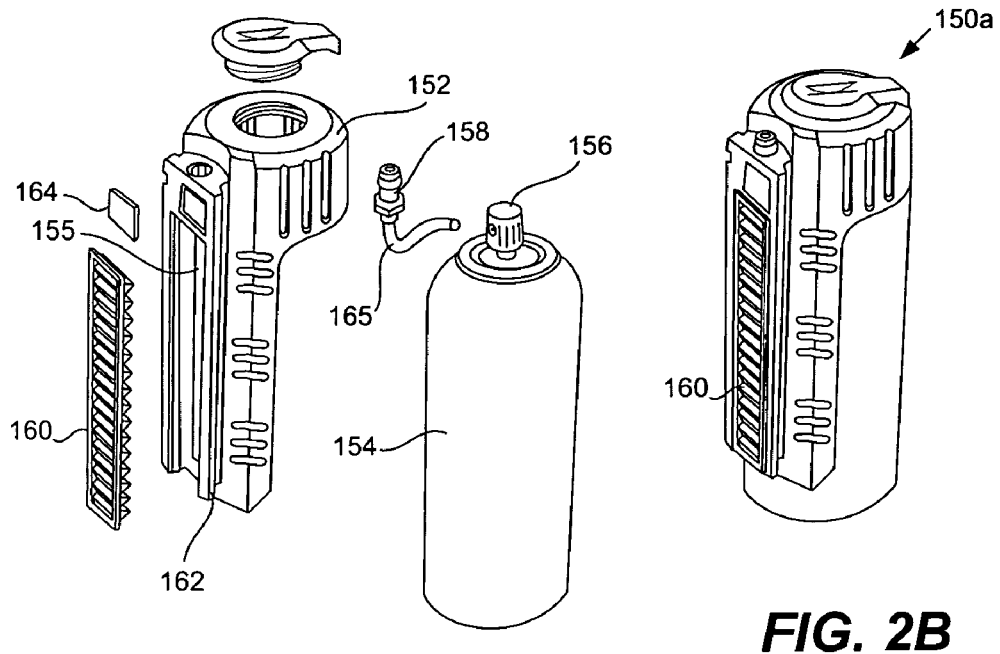
FIG. 2B illustrates an exploded perspective view of a cartridge in accordance with a specific embodiment of the present invention.
Figure 2C:
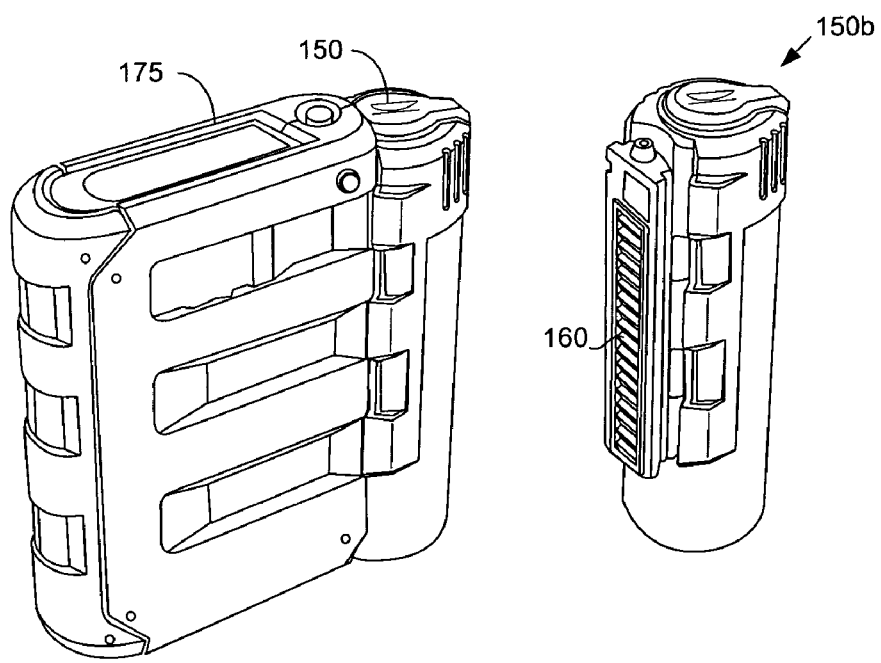
FIG. 2C illustrates a cartridge separate from and mechanically coupled to an exemplary portable fuel cell package in accordance with a specific embodiment of the present invention.

Fuel cell cartridges will now be discussed. FIGS. 2A-2C illustrate exemplary portable fuel cartridges that include one or more disposable components in accordance with various embodiments of the present invention. Disposable components according to the present invention will first be expanded upon before discussing other optional cartridge components.

Air Filter

In one embodiment, a cartridge includes an air filter that intercepts and cleans air inlet to the fuel cell system. FIGS. 2B and 2C illustrate cartridges 150a and 150b that include an air filter 160 in accordance with specific embodiments of the present invention. FIG. 4A illustrates a cartridge 220 that includes an air filter 160 in accordance with another embodiment of the present invention. Although the remaining discussion will describe a single filter on a cartridge, it is understood that fuel cartridge may include multiple filters arranged to interface with the fuel cell package.

Filter 160 is positioned such that air leading into the fuel cell package 175 (FIG. 2C) first passes through the filter before entering the package. FIG. 2B shows the disassembly of cartridge 150a and the positioning of an air filter 160 included in a cartridge assembly 152 in accordance with a specific embodiment of the present invention. Filter 160 is arranged on assembly housing 152 such that when fuel cartridge 150a attaches or detachably couples to a fuel cell system package or a housing included a fuel cell system package 175 (see FIG. 2C), air inlet into the package first passes through filter 160. In one embodiment, filter 160 is positioned on the cartridge so as to rest adjacent to an inlet port on the fuel cell package when the cartridge and package are coupled together (see FIG. 2B or port 225 FIG. 5A).

A fuel cartridge may include one or more vents 180 that receive the air before the air passes through the filter. As the term is used herein, a vent generally refers to a hole or port in a wall or other structure that permits gaseous communication between opposite sides the wall. In this case, vent 180 permits air to enter and pass through internal spaces within the cartridge housing to an inlet side of filter 160. As shown in FIGS. 2B and 4B, vents 180 permit air to enter cartridge housing 152 and pass through internal spaces within housing 152 to the inlet side of filter 160 through a hole 155 in housing 152 that is adjacent to where filter 160 attaches to housing 152. In some designs, the vents permit the cartridge to remain relatively small but still include internal channels and volumes for airflow to service the inlet filter (particularly one that rests directly adjacent to the fuel cell package when the cartridge and package are coupled together).

The vents 180 may be included in any structural member of the cartridge. In the embodiments shown in FIGS. 4B and 4C, air enters the cartridge through multiple vents 180 included in the assembly housing 152 (dashed lines are used to illustrate airflow). For cartridge 220 of FIG. 4A, vents 180 are included in the main housing 154 that surrounds a bladder. In this case, cartridge 220 also includes filter 160 set and recessed into the main housing 154. Cartridges 150 and 220 may or may not include an internal bladder, but generally include an internal volume with space that permits air to pass from vents 182 to the inlet side of filter 160. Assembly housing may include any number of vents to service airflow into the fuel cell package, e.g., from 1 to about 50 is suitable in many embodiments. The embodiment shown in FIG. 4B includes 25 vents (18 on the sides and 7 in the head portion of the housing assembly); the embodiment shown in FIG. 4C includes 12 (four on the sides and eight in the head portion).

Referring to FIG. 4B or 4C, inlet air for the fuel cell system first enters into the cartridge 150 through vents 180, passes through filter 160, and enters into package 175 via a port (not shown in FIG. 4B or 4C) included in the package that matches the position of filter 160 when cartridge 150 and package 175 are coupled together. As one of skill in the art will appreciate, there is a variety of ways of positioning an inlet air filter relative to a portable fuel cell package, and a variety of configurations between an air vent and the filter on a cartridge; different airflow and filtration configurations are suitable for use with the present invention other than the specific examples shown in the figures.

Filter 160 is thus configured to intercept and filter air before a portable fuel cell system receives the air, and removes undesirable particulates and substances from the inlet air stream. In one embodiment, filter 160 includes a micron or submicron particulate filter that includes one or more layers of a filter material. Many filters include a relatively flat profile; in this case, an inlet side of the filter refers to a side of the filter that first receives incoming and unfiltered air, while an outlet side of the filter refers to a second side of the filter, opposite to the inlet side for a flat filter, from which filtered air emerges.

The material used in filter 160 is typically selected based on the undesirable particulates and substances that a system designer wants to remove from the inlet air stream. Filter cost and size may also affect selection. Particulates and substances captured by filter 160 may include any contaminant that may damage a fuel cell system or affect fuel cell system performance. For example, such contaminants include those that may damage a cathode or affect a cathode catalyst used in the fuel cell, or those that may affect a catalyst included in a reformer or burner in the fuel processor. Specific examples include: dust, dirt, smoke, sand, liquids such as water or an oil, soot particles, cordite or other explosives residue, pet dander, carpet fibers, pollen, etc. Filters suitable for removing any of these particulates and substances are commercially available from a wide variety of vendors. Water, for example, could be filtered using Goretex or a similar material that blocks water while allowing air to pass through. One suitable air filter for capturing dust is supplied by Small Parts Inc. Part number: CMP-0297-D, (297 micron Polypropylene).

Figure 3:
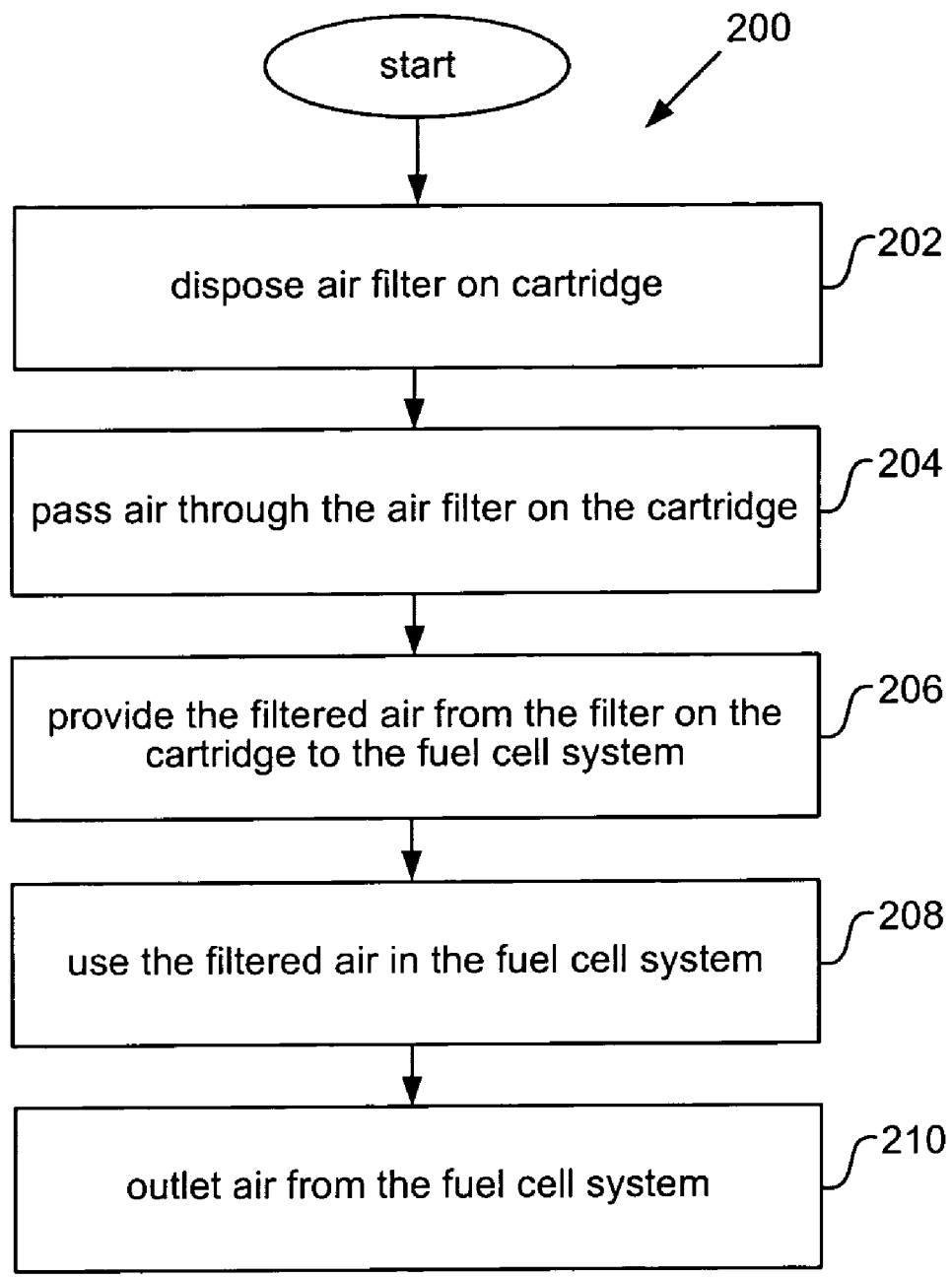
FIG. 3 illustrates a method for filtering air used in a portable fuel cell system in accordance with one embodiment of the present invention.

FIG. 3 illustrates a method 200 for filtering air used in a portable fuel cell system in accordance with one embodiment of the present invention.

Method 200 begins by disposing an air filter on a fuel cartridge for use with a portable fuel cell system (202). Several exemplary air filter and cartridge configurations are provided above. In one embodiment, the air filter is added to the fuel cartridge when the fuel cartridge is initially manufactured. In another embodiment, the air filter is replaced (a new filter replaces an old and used one) or refurbished when the cartridge is refilled. Refurbishing the filter may include an automated process that releases trapped particulates from the filter, such as blowing high-pressure air, in an opposite direction from the direction of filtration, to release trapped particulates.

Method 200 proceeds, during fuel cartridge usage with a fuel cell system, by passing air through the air filter on the cartridge to produce filtered air (204). In one embodiment, the cartridge air filter rests adjacent to a port on the fuel cell system package and a pressure source within the package provides a negative pressure to the outlet side of the filter, thereby drawing air into the inlet side of the filter, through the filter material, and out the outlet side. As mentioned above, the air may enter a portion of the cartridge housing through one or more vents arranged permit air passage through the housing into the inlet side of the filter.

Filtered air then passes from the outlet side of the filter on the cartridge to the fuel cell system in the portable package (206). In one embodiment, air passes into the fuel cell package and immediately travels to an air source included in the portable package (or multiple air sources). In one embodiment, the air source is disposed along an air path between the filter and a downstream recipient of the air in the fuel cell package. In this case, the air source creates a negative pressure across the filter and draws air from the ambient room, through the filter and into the package, and may also provide a positive pressure for moving the air to the downstream recipient in the fuel cell system.

Figure 5A:
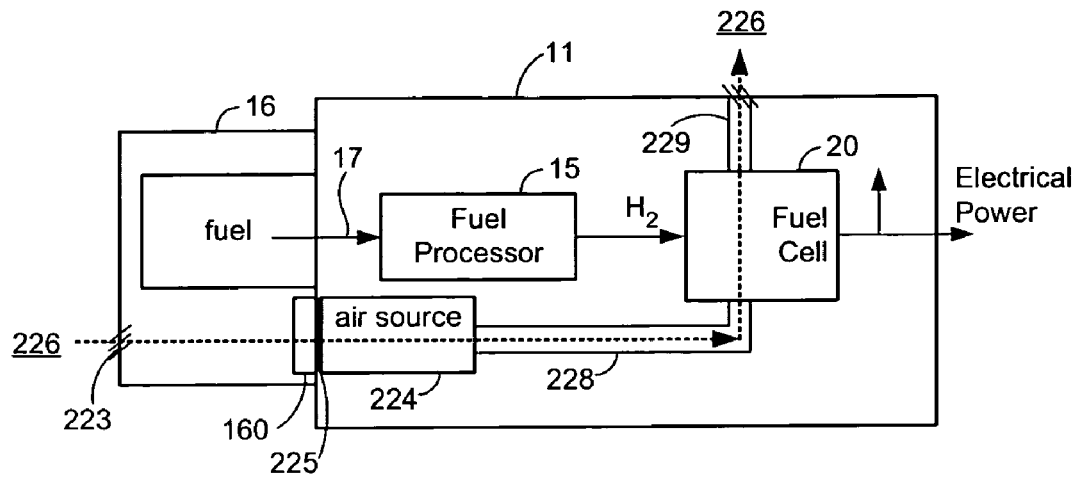
FIGS. 5A-5C illustrate exemplary airflow patterns that pass through an air filter on a cartridge and into portable fuel cell system package according to various embodiments of the present invention.
Figure 5B:
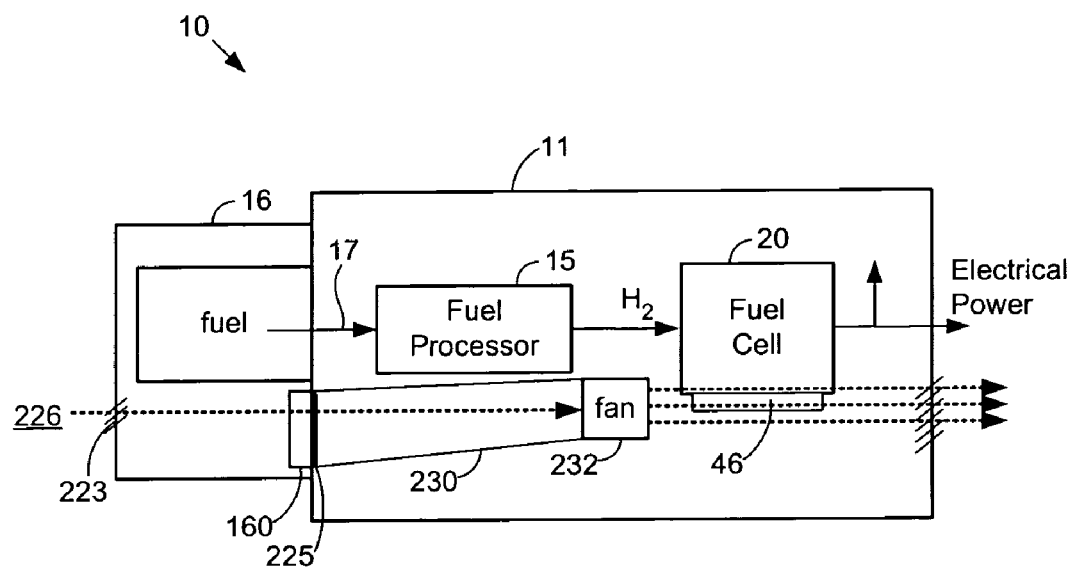
Figure 5C:
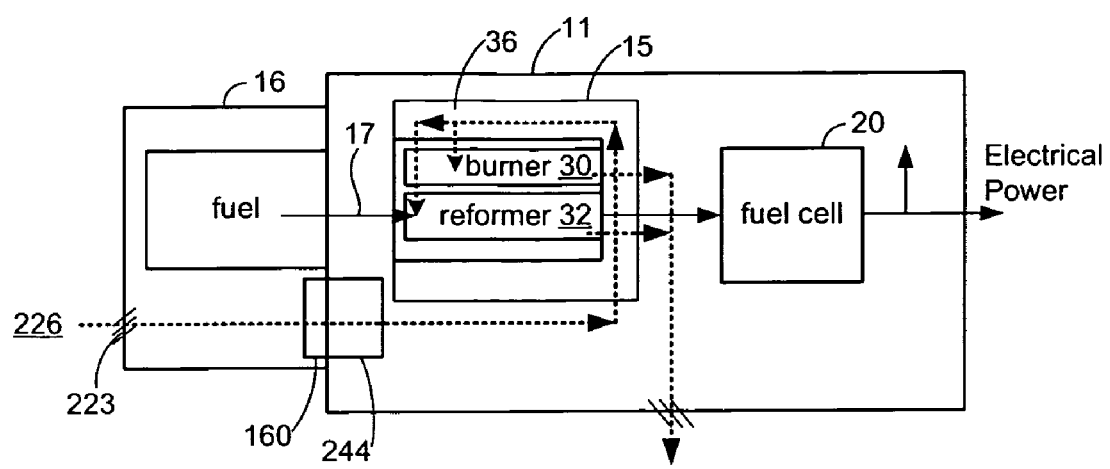

The filtered air is then used in the fuel cell system (208) before exhaust of the air from the fuel cell system or package (210). The present invention contemplates several uses for filtered air in a portable fuel cell system. FIGS. 5A-5C illustrate exemplary airflow patterns that pass through an air filter 160 on a cartridge 16 and into portable fuel cell system package 11 according to various embodiments of the present invention.

In one embodiment, and as shown in FIG. 5A, air source 224 provides the filtered air to fuel cell 20 for electrochemical reaction and electrical energy production. Air source 224 moves air (airflow is shown by dotted lines) from the ambient environment 226, through the cartridge 16, into and out of portable package 11. More specifically, air source 224 applies a negative pressure and pulls air: from the ambient environment 226, through one more vents 223 in cartridge 16, through an internal space in the cartridge housing, through filter 160, into a port 225 on an outer wall of package 11. Air source 224 then pushes air, via internal air conduit 228, to a cathode in fuel cell 20 where some oxygen in the filtered air is used in the cathode to generate electricity and water. Conduit 228 may include one or more straight or bent channels internal to package 11, such as one more fixed channels in a metal wall of the fuel cell or internal wall the package housing. Conduit 228 opens to a cathode intake manifold that distributes the air and oxygen within the fuel cell. A cathode exhaust manifold then collects the used air and oxygen after chemical processing in fuel cell 20 for outlet via exhaust conduit 229, which outlets the fuel cell exhaust into ambient environment 226.

In this case, filter 160 is selected to remove particulates and contaminants in the ambient environment that may affect fuel cell 20 and any of its components. For example, a cathode catalyst in the fuel cell interacts with the incoming air (intentionally only the oxygen) and will benefit when filter 160 removes particulates in the air that degrade, or are harmful to, the cathode catalyst. Another failure mode caused by particulate ingestion is blockage of gas and liquid passages over time; for example, small gas passage could become blocked with small dust particles thereby preventing access of air to one or more cells in the fuel cell stack. Such particulates include, for example, sand, pollen, pet or carpet fibers for example. One suitable air filter is supplied by Small Parts Inc. Part number: CMP-0297-D, (297 micron Polypropylene).

Air source 224 may include any pump, compressor, fan, or any other device suitable for moving air. Small fans of a desired flow rate are commercially available from a wide variety of vendors. In a specific embodiment, a model BTC compressor as provided by Hargraves, N.C. is suitable to pressurize oxygen and air for air movement as shown in FIG. 5A.

In another embodiment, and as shown in FIG. 5B, an air source includes a larger fan 232 that moves filtered air across fuel cell 20 for cooling and thermal management.

In this case, fan 232 draws air from the ambient environment 226, through one more vents 223 in cartridge 16, through an internal space in the cartridge housing, through filter 160, and into a port 225 on an outer wall of package 11. Fan 232 then blows cooling air 230 over one or more portions of fuel cell 20. In a specific embodiment, fuel cell 20 includes one or more heat transfer appendages 46 that permit conductive heat transfer with internal portions of a fuel cell stack. Thus, cooling fan 232 blows cooling air at ambient room temperature, over the heat transfer appendages 46, which permits dedicated and controllable conductive/convective cooling of internal portions of fuel cell 20 (by turning on/off fan 232) during electrical energy production. In this embodiment, a model AD2005DX-K70 fan as provided by Adda USA of California, or part number YW03015005BM provided by Y.S. Technologies of Taiwan, are suitable for use. After cooling fuel cell 20, the air is outlet from package 11 using an exhaust port in the housing of package 11. In another embodiment, fan 232 is positioned to blow air across fuel processor 15 for cooling of the fuel processor.

For cooling filtration, filter 160 is selected to remove particulates and contaminants in the ambient environment that a designer does not want internal to package 11. Such particulates include, for example, sand and small fibers. One suitable air filter is a FC3 filter material as provided by Donaldson Company Inc. of Minneapolis, Minn.

In another embodiment, and as shown in FIG. 5C, an air source moves filtered air into fuel processor 15.

In this case, fuel processor 15 includes a burner 30, a reformer 32 and a regenerator 36. Burner 30 uses catalytic combustion to generate heat for reformer 32. In a specific embodiment, burner 30 receives fuel 17 from cartridge 16 and consumes the fuel in the presence of oxygen (in the filtered air) to generate heat. A catalyst in reformer 32 reacts with the fuel 17 to produce hydrogen and carbon dioxide; this reaction is endothermic and draws heat from burner 30, and also uses oxygen in the filtered air.

Regenerator 36 pre-heats incoming filtered air before the air enters burner 30 and reformer 32. In one sense, regenerator 36 uses outward traveling waste heat in fuel processor 15 to increase thermal management and thermal efficiency of the fuel processor. Specifically, waste heat from heater 30 pre-heats incoming filtered air provided to reduce heat transfer to the air within the heater. As a result, more heat transfers from the burner to reformer 32. Regenerator 36 also functions as insulation for the fuel processor. More specifically, by reducing the overall amount of heat loss from fuel processor 15, regenerator 36 also reduces heat loss from package 11 by dissipating it into filtered air going into the fuel processor for chemical processing (before the heat escapes the system). This reduces heat loss from fuel processor 15, which results in a cooler fuel cell system package.

Air source 244 applies a negative pressure and pulls air: from the ambient environment 226, through one more vents 223 in cartridge 16, through filter 160, and into package 11. Air source 244 then pushes the filtered air, via internal an air conduit (not shown), to regenerator 36 where the filtered air is heated using exhaust heat generated in the fuel processor. The heated and filtered air then proceeds to the burner 30 and reformer 32 for chemical reaction in each. The used air is then exhausted from the fuel processor 15 and package 11.

In this case, filter 160 is selected to remove particulates and contaminants in the ambient environment that may affect or poison fuel processor 15 and any of its components. For example, a reformer catalyst such as palladium interacts with the incoming air and will benefit when filter 160 removes contaminants that are harmful to the reformer catalyst. Such particles include, for example, soot and hydrogen sulfide. One suitable air filter is a FC3 filter material as provided by Donaldson Company Inc. of Minneapolis, Minn.

Many fuel cartridges are intended for disposable or reusable use. Including filter 160 on a disposable or reusable fuel cartridge advantageously allows replenishable filtering for a fuel cell system. Since most filters are limited life devices and are intended for replacement at some point, placing a filter on a disposable or reusable fuel cartridge advantageously allows a user to replace a fuel cell system filter when a replacement cartridge is swapped in, as opposed to replacing a filter on the fuel cell system package or electronics device, which may have an operational lifetime of years.

In another embodiment, the fuel cell system package 11 includes a second filter that doubly intercepts the filtered air output from filter 160. This provides another layer of filtration to further reduce contaminant presence in the fuel cell system. Any of the above mentioned systems described in FIGS. 5A-5C may benefit from this secondary filtration. Thus, another air pathway proceeds as follows: ambient room or space, through one or more vents, through the filter included in the cartridge, through one or more filters included in the package, to a compressor or blower, through the cathode distribution in the fuel cell such as the cathode intake manifold, collection of the used air in a cathode exhaust manifold, and out an exhaust for the fuel cell package. Providing airflow through one or more filters on a fuel cartridge before passage through the second filter in the fuel cell system package allows the secondary filter to work less, which extends the operable lifetime of the second filter.

Figure 6:
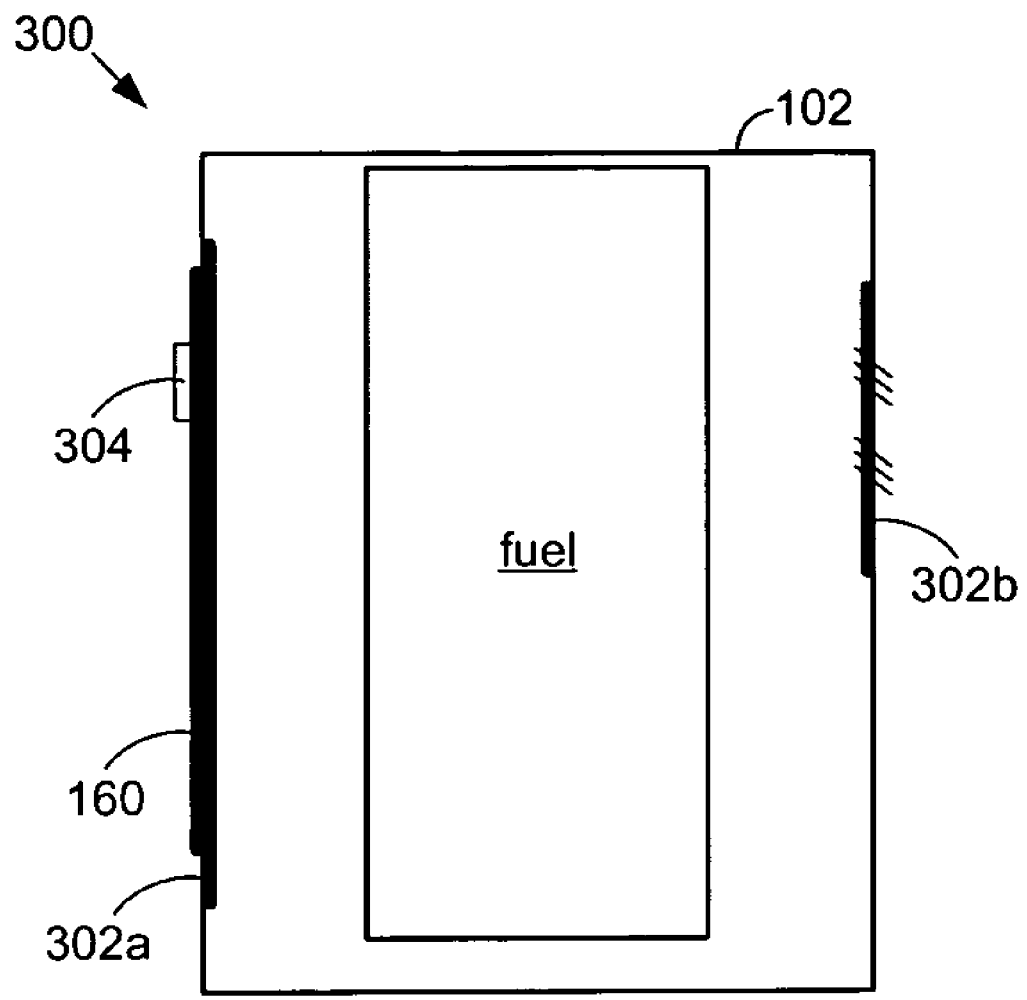
FIG. 6 shows a simplified portable fuel cartridge in accordance with another embodiment of the present invention.

A portable cartridge of the present invention may include other disposable components on the inlet airflow. FIG. 6 shows a simplified portable fuel cartridge 300 in accordance with another embodiment of the present invention. Cartridge 300 includes a housing 102, filter 160, hydrophobic filter 302 and a sensor 304. Housing 102 will be described in further detail below.

Hydrophobic filter 302 prevents the passage of water therethrough. As shown, hydrophobic filter 302a is placed adjacent to, and on the air inlet side, of filter 160 to prevent water from reaching filter 160 and from penetrating into a port in a fuel cell system package that receives filtered air from filter 160. This prevents water from reaching internal portions of the package.

In addition, a hydrophobic filter 302b is arranged on the inner wall of housing 102 to cover vents 180. Hydrophobic filter 302b acts as a waterproof membrane that prevents water from entering cartridge 300 through vents 180. Together, hydrophobic filters 302a and 302b prevent water from reaching internal portions of fuel cartridge 300.

In each hydrophobic filter embodiment, hydrophobic filter 302 prevents liquid water from entering the fuel cartridge and/or fuel cell package (or an electronics device as the package), but allows air to pass through filter 302. Hydrophobic filters suitable for use with a fuel cartridge of the present invention are commercially available from a wide variety of vendors. The hydrophobic filter 302 may comprise micro porous Teflon or another micro porous material such as Teflon coated paper. A sintered metal filter, for example one with a 3 micron pore size, may also be used. One suitable filter 134 includes micro porous "Gore Tex" Teflon as provided by WL Gore Associates of Elkton, Md.

A hydrophobic filter 160 also prevents fuel 17 from escaping cartridge 300 housing in the event that a bladder in the cartridge develops a leak.

In another specific hydrophobic filtration embodiment, filter 160 is selected such that it has both hydrophobic properties and filtering properties as described above with respect to FIGS. 5A-5C.

In one embodiment, a fuel cartridge includes a sensor that detects a parameter or state pertinent to a user or the fuel cell system. Sensor 304 is disposed along the inlet airflow to the fuel system to detect one or more properties or states of the inlet air. The property may include the concentration of a substance in the air, for example. In a specific embodiment, sensor 304 includes a carbon monoxide or other hazardous gas detector or indicator. A carbon monoxide sensor 304 disposed to measure carbon monoxide in the inlet air stream informs a user or the fuel cell system when an undesirable level of carbon monoxide is in the ambient room. Other hazardous gases that may be detected by a sensor on cartridge 300 include methanol, hydrogen, and formaldehyde, for example In one embodiment, the fuel cell package includes an infrared or other detector that is configured to probe and read sensor 304. For example, sensor 304 may include a carbon monoxide sensor that changes color the presence of a threshold carbon monoxide concentration. The infrared sensor then detects the change in color, and informs a system controller on the portable fuel cell system package that an undesirable level of carbon monoxide has been detected. The fuel cell system controller may then shut down the fuel cell system, eject the cartridge, or carry out some other reaction in response to detecting the event from sensor 304. Putting one or more carbon monoxide or other hazardous gas sensor 304 on the inlet airflow then detects concentration levels in the ambient room, as opposed to putting the sensor on the exhaust outflow (see below), which detects carbon monoxide concentration level output by the fuel cell system (which may be minute relative to the size of the ambient environment).

Other gases may be monitored (and used control output of a fuel cell, for example). The sensor, in conjunction with the control system, can infer the specified gas composition in the incoming air stream, and compare the concentration to a threshold value, which if exceeded could cause the fuel cell to shut down. For example, IEC standard 62282-6-1 Ed.1/PAS, which governs the use and transport of portable methanol fuel cells on commercial aircraft, lists the following maximum emissions rates and concentration limits for a 1 $m^3$ air volume with 10 air changes per hour (see Table 1). Any of these materials or concentrations are suitable for use with a sensor of the present invention. Other concentrations may be detected by a sensor. In a specific embodiment, the fuel cell system controller is configured to shut down the fuel cell system when one of these parameters is detected on a cartridge sensor.

TABLE 1

IEC Standard 62282-6-1 Ed.1/PAS Emissions.

| | Concentration Limit | Emission Rate Limit |
|---|---|---|
| Water | Unlimited | No limit |
| Methanol | 260 mg/$m^3$ | 2600 mg/hour |
| Formaldehyde | 0.1 mg/$m^3$ | 0.6 mg/hour |
| CO | 29 mg/$m^3$ | 290 mg/hour |
| $CO_2$ | 9 g/$m^3$ | 60000 mg/hour |
| Formic Acid | 9 mg/$m^3$ | 90 mg/hour |
| Methyl Formate | 245 mg/$m^3$ | 2450 mg/hour |

Exhaust Filtering

In another disposable component embodiment, a fuel cartridge includes an exhaust filter that cleanses gaseous exhaust produced by a portable fuel cell system. Imperfect chemical processing in a fuel cell or fuel processor or other ancillary catalytic reactor such as a fuel cell startup burner or gas clean-up reactor may produce or not fully eliminate one or more unintended exhaust products, or exhaust products at unintended levels. An outlet filter—on the cartridge—removes and reduces these exhaust products from the fuel cell system exhaust. Including the exhaust filter on a temporary cartridge permits the exhaust filter to be replenished each time the cartridge is switched.

Figure 7:
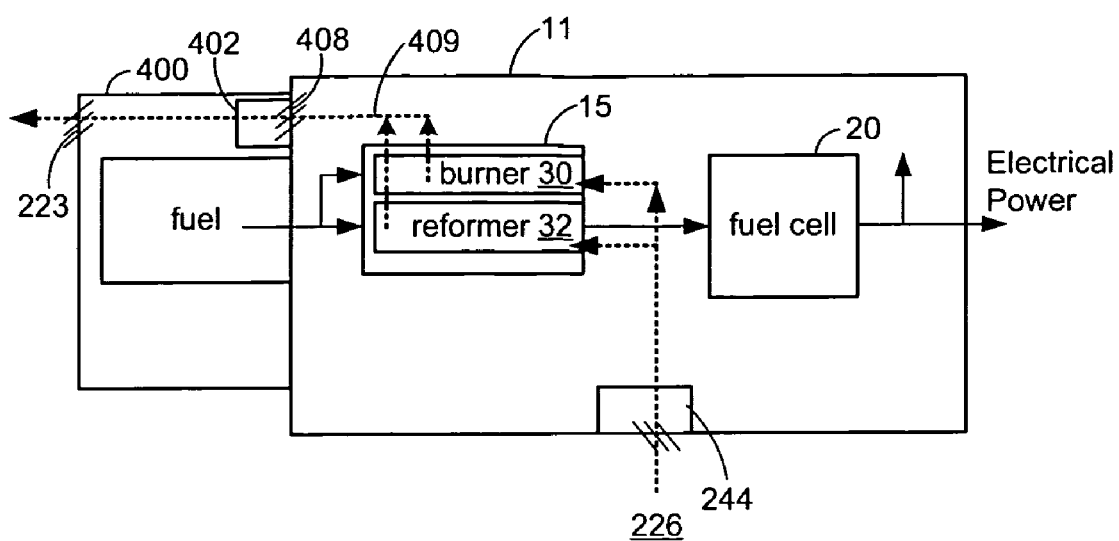
FIG. 7 illustrates a cartridge that includes an exhaust filter configured to clean and separate out one or more exhaust products included in an exhaust produced by a fuel cell system in package in accordance with another embodiment of the present invention.

FIG. 7 illustrates a cartridge 400 that includes an exhaust filter 402 configured to clean and separate out one or more exhaust products included in an exhaust 409 produced by a fuel cell system in package 11. As shown, cartridge 400 is currently coupled to package 11.

Exhaust filter 402 is configured to intercept gaseous exhaust produced by fuel cell system package 11. As shown in FIG. 7, exhaust filter 402 is disposed on a wall of cartridge 400 proximate to outlet port 408 of package 11 when cartridge 400 is coupled to package 11.

An air source 244 (as described above with respect to FIG. 5C) draws air in from ambient environment 226 and supplies the air to a catalytic burner 30 and a reformer 32 in fuel processor 15. Oxygen in the air is then used for chemical processing in burner 30 and reformer 32. Each fuel processor component outputs its own exhaust to a common exhaust line for output from package 11. Burner 30 catalytically combusts fuel and oxygen in the air to produce combustion byproducts that are output from package 11. Incomplete combustion may produce carbon monoxide, for example. Reformer 32 catalytically processes the incoming fuel, such as a hydrocarbon fuel, to produce hydrogen and carbon dioxide. Imperfect fuel processing in reformer 32 may also produce carbon monoxide, for example.

The undesirable exhaust products in exhaust 409 may include any chemical byproducts produced by a fuel cell or fuel processor or other ancillary reactors such as a fuel cell heat-up burner or gas clean-up reactor. In addition to carbon monoxide, exemplary exhaust products captured by filter 402 include: methanol, formaldehyde, formic acid, methyl formate, hydrogen sulfide, hydrogen, and ammonia from fuel processor 15, and/or carbon monoxide, phosphoric acid, fluoric acid, and ammonia from fuel cell 20. Other fuel cell systems may include other by-products, depending on the system and the fuel. For example, a butane fuel may be reformed and the exhaust filters for butane or methane. In general, the filter may detect or remove any reactant or byproduct in a fuel cell system, where the exhaust byproducts are intended or not. This also includes filtering for materials added to the fuel, such as oderrants and colorants added to the fuel, which may or may not pass through the fuel cell system.

Exhaust filter 402 is selected based on the exhaust products to be filtered out of the exhaust stream. Exhaust filter 402 may include a scrubbing bed filled with a material, such as activated carbon, potassium permanganate, cupric chloride ($CuCl_2$) or another catalyst that reacts with the exhaust products to be cleansed. The catalyst or absorbent absorbs CO, methanol vapor or $H_2S$. For example, one suitable carbon monoxide filter is a copper chloride particles disposed between two porous meshes, or disposed onto a porous structure such as a silica frit. If copper chloride-based materials are used, a color change will occur when the material becomes saturated with CO; this could lend itself to optical sensing and control feedback on the fuel cell system. One suitable formaldehyde filter is composed of 2,4-dinitrophenyl hydrazine, or high surface area activated carbon particles, disposed between two porous meshes; or disposed onto a porous structure such as a silica frit. Other exhaust filters are suitable for use, for removal of a range of gasses as needed i.e., see above table of IEC regulations In addition, multiple exhaust filters 402 may be used, where each filter removes a different byproduct from the exhaust stream. For example, a first exhaust filter 402 may be disposed to separate out carbon monoxide, while a second exhaust filter 402 cleans formaldehyde from the exhaust stream.

In one embodiment, passing hydrogen through filter 402 when the storage device 400 is refilled with fuel rejuvenates exhaust filter 402. Alternatively, exhaust filter 402 may be replaced with a filter when the storage device 400 is refilled.

Dessicant

Figure 8:
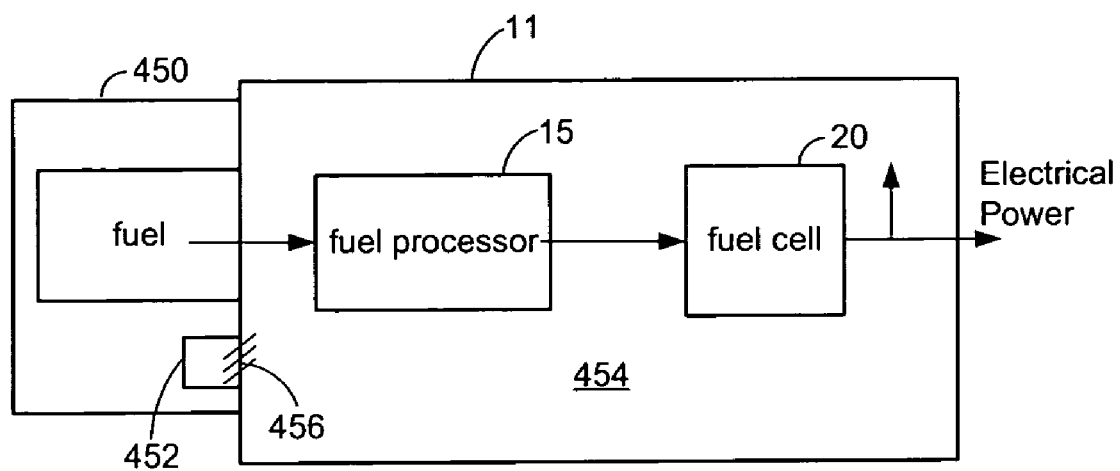
FIG. 8 shows a portable fuel cartridge that includes a desiccant in accordance with a specific embodiment of the present invention.

In another embodiment, a portable fuel cartridge includes one or more desiccants for lowering humidity in a fuel cell system package that is coupled to the cartridge. FIG. 8 shows a portable fuel cartridge 450 that includes a desiccant 452 in accordance with a specific embodiment of the present invention.

As shown, desiccant 452 opens into a volume 454 internal to package 11. Desiccant 452 passively absorbs moisture within volume 454, thus decreasing the humidity within volume 454 both when the fuel cell system is on and when it is inactive. Desiccant 452 typically works over extended durations, and thus is well suited to absorb moisture over long periods of time, such as when the fuel cell is shut off between uses. In one sense, desiccant 452 acts as a passive moisture sink to absorb moisture internal to the portable fuel cell system package 11. This prevents the moisture from collecting on components (such as 15, 20, and their constituents) within the package, particularly when the fuel cell system is not in use.

The moisture may come from various sources. Many portable fuel cell systems are used in environments that promote moisture aggregation internal to the fuel cell system package. For example, humid environments often leave high levels of moisture inside the portable package after the fuel cell system is turned off. A cooling fan may newly introduce humid air each time the fuel cell system is used. Moisture in the humid air then gathers on (or in) the fuel cell system components, and may damage them. For example, catalysts in a fuel processor may be damaged by inadvertent moisture aggregation internal to the fuel processor. Moisture may also come from fuel cell 20; moisture is often a product of the electrochemical reaction in a fuel cell, and is present in package 11 after shut down. Another moisture issue: many fuel cell systems operate at elevated temperatures; as fuel cell components cool, moisture internal to package 11 in the humid air often condenses on cooling components.

Desiccant 452, however, absorbs moisture internal to package 11 so as to reduce or minimize moisture collection on (or in) internal components of package 11. Desiccant 452 even absorbs moisture after the fuel cell system has been shut down, which may draw out moisture in package 11.

Desiccant 452 is in gaseous and moisture communication with internal volume 454. In one embodiment, desiccant 452 is disposed on cartridge 450 such that when the cartridge mechanically couples to package 11, desiccant 452 is proximate to vent 456. Vent 456 permits gaseous and moisture communication between desiccant 452 and internal volume 454. As mentioned above, vent 456 may include any hole or port in a wall or other structure that air or moisture can travel through. In this case, vent 456 permits gaseous communication between internal volume 454 and outside package 11.

Desiccant 452 may include one or more commercially available moisture absorption materials or products. For example, numerous vendors provide commercially available sacs that allow air to pass therethrough and include small desiccants beads in the sacs. Multiple sacs may be used to increase desiccant absorption, while using inexpensive and commercially available products. One suitable desiccant is Drierite 97% $CaSO_4$, 3% $CoCl_2$ beads supplied by W.A. HAMMOND DRIERITE CO. LTD., Xenia, Ohio.

In one embodiment, desiccant beads are disposed on a gaseous filter such as that described above with respect to filter 160 (FIG. 2B). For example, silica beads may be attached onto filter 160. In this case, the same vent that is used to communicate air with filter 160 is also used for moisture control within package 11. In another specific embodiment, the desiccant beads are sandwiched and trapped between filter layers in a multiple layer filter 160.

Similar to disposable advantages described above with respect to the filters, desiccants 452 offers a renewable and replenishable source of moisture absorption/control each time a fuel cartridge is replaced for portable fuel cell system. This reduces resources on the fuel cell system needed for moisture control. In some cases, the fuel cartridge is shipped and stored in a vapor barrier such as a commercially available vacuum pack that prevents desiccant usage and exhaustion before initial usage of the fuel cartridge with a fuel cell system package.

Fuel Absorbent

Figure 9:
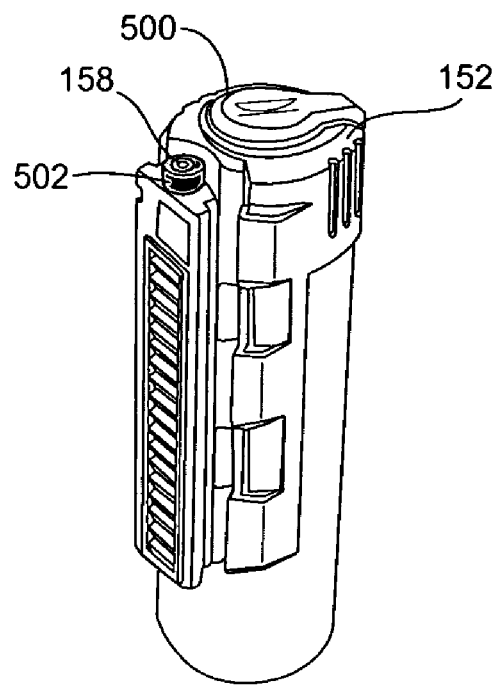
FIG. 9 shows a portable fuel cartridge that includes an absorbent in accordance with a specific embodiment of the present invention.

A cartridge of the present invention may also include an absorbent such as a small sponge or swab, located on or near a fuel connector, to collect any fuel leakage during device connection or disconnection. FIG. 9 shows a portable fuel cartridge 500 that includes an absorbent 502 in accordance with a specific embodiment of the present invention.

Absorbent 502 attaches to a wall in cartridge assembly housing 152, proximate to fuel connector 158. Absorbent 502 is thus positioned to soak up fuel misplaced between cartridge 500 and a fuel cell system package.

For example, fuel may leak during connection and disconnection between cartridge 500 and package 175 (FIG. 2C). Alternatively, fuel may escape from fuel connector 158 during rough handling.

The fuel absorbing capacity of absorbent 502 will depend on the size and material of absorbent 502. In one embodiment, absorbent 502 is sized small enough to not interfere with connection between cartridge 500 and a fuel cell system package, but large enough to absorb small amounts of fuel that may escape from the intended fuel line. Absorbent 502 may include any material suitable for absorbing a fuel. An inexpensive absorbent is small piece of a commercially available sponge. Absorbent 502 may also be selected based on a specific fuel used in the fuel cell system.

Similar to the other disposable components described herein, absorbent 502 is replenished each time a new cartridge is used. This simplifies a fuel cell system package by removing a need for similar functionality at the mating connector on the fuel cell system package.

In one embodiment, the fuel includes a colorant and absorbent 502 stains when it soaks the fuel. A sponge with a neutral or soft color is suitable for use in this regard. Suitable colorants are described in further detail below.

Other Suitable Fuel Cartridge Components

Having discussed disposable components in accordance with the present invention, other components suitable for use with a portable fuel cartridge will now be expanded upon.

Returning to FIG. 2A, cartridge 16 stores a fuel 17. In this case, cartridge 16 includes a bladder 100, housing 102 and connector 104.

Bladder 100 contains fuel 17 and conforms to the volume of fuel in the bladder. Compliant walls 101 of bladder 100, which expand and/or open when fluid is added to bladder 100, form the volume and contract and/or collapse when fluid is removed according to the negative pressure developed upon fluid removal. In one embodiment, bladder 100 includes a sac that changes size and shape with the volume of liquid contained therein. Plastic, rubber and latex are suitable materials for use as the walls 101 of bladder 100. In this case, the walls are compliant and change size with a changing liquid volume, and in some cases the walls allow for stretching with high fluid pressures in bladder 100. Walls 101 may also comprise a fire retardant material. One suitable fire retardant plastic for walls 101 is NFPA-701-99 Test 1 Polyethelyne as provided by Plasticare of Orange Park, Fla. In another embodiment, bladder 100 comprises a fixed cylinder and a piston that is pushed by a spring and moves in the cylinder to pressurize the bladder and displace volume according to used fuel.

A maximum volume 119 characterizes bladder 100 when the bladder fully expands. Maximum bladder volumes may vary with an application. In a specific embodiment, maximum volumes for cartridge 16 range from about 20 milliliters to about 4 liters. Maximum volumes from about 20 milliliters to about 800 milliliters are suitable for many portable electronics applications. A maximum volume for bladder 100 of about 200 to about 500 milliliters is suitable for laptop computer usage and many portable applications. The maximum volume for bladder 100 may differ from the fuel capacity of cartridge 16, e.g., it includes multiple bladders. Furthermore, some applications may require the use of a fuel cartridge & bladder, which is sized to offer several weeks or more of run time. Such a cartridge could have 10-20 L of fuel.

While the present invention will now primarily refer to the storage of a fuel in a collapsible bladder, it is understood that a cartridge of the present invention may contain other systems for storing a fuel. In general, a cartridge of the present invention may include any volume internal to a housing for sized to store a fuel. For example, a cartridge may include a sealed internal compartment or volume that stores a fuel and a spring that pushes on a moveable wall for the compartment (and no bladder); as the fuel is consumed, the spring passively changes internal volume. Another suitable fuel storage design includes one or more chambers located within the rigid housing; one may be used as the primary fuel storage, and a second used as a receptacle for waste by-products, such as sodium borate or sodium carbonate for example, which must be disposed of when the cartridge is disposed of or recycled. Alternatively, two or more bladders may be used as primary fuel storage, such as for example, water and diesel fuel or aluminum powers and water, which must be mixed together in order for the fuel cell system to generate power, but which are not miscible with each other or which cannot be safely stored in the same cavity. Another suitable fuel storage design includes a wick that draws fuel from an internal cavity of fixed dimensions. Additionally, the cartridge bladder may be pressurized, either by a pressure source on the fuel cell, such as the air compressor for example, or by means of a propellant; the pressure source being applied in the space between the bladder and the outer wall. Furthermore, additional pressurization options are available; a propellant such as dimethyl-ether (DME) may be mixed into the fuel mixture. For example 5-30% DME mixed with a 67% (volume) mixture of methanol and water may be used as means of applying pressure internal to the bladder; the resulting mixture can then be fed into the fuel system. Thus, fuel storage configurations that do not include a bladder are also suitable for use herein.

Housing 102 provides mechanical protection for fuel 17, bladder 100 and any other components of storage device 16 included within housing 102. Housing 102 comprises a set of rigid walls 110 that contain bladder 100 and other internal components of cartridge 16. Walls 110 collectively form an outer case or shell that mechanically separates components internal to housing 102 from the external environment. Walls 110 also collectively form an interior cavity 112. Interior cavity 112 is a space within storage device that contains fuel 17 and bladder 100. Interior cavity 112 may comprises multiple compartments, each of which includes its own fuel storage (e.g., a separate bladder).

Various embodiments provided above show additional walls used in housing 102 (see FIGS. 2B and 2C). Housing 102 is referred to herein as a 'housing assembly' when one or more rigid walls or parts are added to cartridge 16 and provide additional functionality other than just containment of internal components. Such functionality may include connectivity with a package (e.g., a sliding interface for mating with a sliding interface on a fuel cell package), filtration of air going into a fuel cell system package as described above, and holding one or more components of the cartridge such as a chip.

Rigid walls 110 may comprise a suitably stiff material such as a plastic, metal (e.g., aluminum), polycarbonate, polypropelene, carbon fiber matrix, carbon composite material, etc. Rigid walls 110 may also be formed from a fire retardant material such as a fire retardant plastic material. One suitable fire retardant plastic material for walls 110 is 8-12% weight, JLS-MC mixed with PA66 Polyamide as provided by JLS Chemical of Pomona, Calif. Rigid walls 110 may be designed according to criteria for construction of thin walled pressure vessels. In this case, walls 110 and housing 102 may be designed to withstand a maximum pressure within bladder 100.

Housing 102 may be variably shaped as desired by an application and the present invention is not limited to any particular shape. In one embodiment, housing 102 includes an elliptical (including circular) cross section, a rectangular cross section with chamfered corners, or other substantially consistent profile or shape in a given direction. For the embodiment shown, housing 102 includes a) a top cap 109 that holds connector 104 and b) a substantially consistent cross section in a direction that extends away from the top cap.

Connector 104 interfaces with a mating connector 140 included in device 11 (FIG. 1). Mating connector 140 may be disposed on a variety of devices. In one embodiment, mating connector 140 is disposed on a side portion of an OEM device (i.e. a laptop computer). In another embodiment, mating connector 140 is included in a portable fuel cell package. Mating connector 140 may also be included in refilling hardware that refills cartridge 16 with fuel source 17.

Together, connector 104 and mating connector 140 permit transfer of fuel source 17 between bladder 100 and the external device 11. When mating connector 140 is included in a device that includes fuel processor 15 (FIG. 1), connector 104 and mating connector 140 interface to permit transfer of fuel 17 from cartridge 16 to fuel processor 15, and through any intermediate plumbing between the two. Alternatively, when mating connector 140 is included in a hydrogen fuel source refiller, connector 104 and mating connector 140 interface to permit transfer of fuel 17 from the refiner to cartridge 16. Interface between connector 104 and mating connector 140 may comprise any relationship and mating structures that permit fluid communication between the two connectors. Several contact valves and configurations are provided below.

When mating connector 140 and connector 104 are mechanically coupled, a pump in device 11 and run by a fuel cell system controller draws fuel 17 into device 11. More specifically, fuel 17 travels from bladder 100, through tube 107 and connector 104, into and through mating connector 140, and through tube 111 in device 11 to a fuel processor 15 included therein.

In one embodiment, connector 104 or mating connector 140 includes a contact valve, which when depressed, permits fuel flow between the device and cartridge. In this case, the connector only opens when contacting the other while cartridge 16 interfaces with device 11. This provides contact shutoff capability when cartridge 16 is removed. Dual contact valve designs are also permissible in which both contact valves must be depressed before fuel flows.

Cartridge 16 and device 11, and or connector 104 and mating connector 140, may also include detachable mechanical coupling to selectively secure the interface, such as sliding interfaces and latching elements that bind connector 104 and mating connector 140 together until physically released.

In one embodiment, connector 104 incorporates a quick disconnect that permits cartridge 16 to be readily removed by pulling on housing 102 (or the assembly housing). This separates connector 104 and mating connector 140 and separates any electrical links and detaches plumbing responsible for fluid communication between cartridge 16 and device 11. A second cartridge 16 with a quick disconnect connector 104 may then be readily inserted back into mating connector 140. The quick disconnect allows rapid replacement of cartridge 16 with another cartridge 16 when fuel source volume levels are low. Further description of cartridge connectors suitable for use with the present invention are described in commonly owned and co-pending patent application Ser. No. 11/316,216, which is incorporated by reference herein in its entirely for all purposes.

Cartridge 16 may also includes one or more vents in housing 102 that allow air to enter and exit as a bladder 100 changes in volume. The air vent comprises one or more holes or apertures in a wall of housing 102. In operation, as fuel 17 is consumed and drawn from cartridge 16, bladder 100 collapses and creates a negative pressure in internal cavity 112 outside of bladder 100. Based on this negative pressure caused by a decreasing volume of bladder 100 (or increasing volume of internal cavity 112 outside bladder 100), air enters through the air vent into internal cavity 112 and displaces the decreasing volume of bladder 100. When filling cartridge 16, positive pressure caused by an increasing volume of fuel 17 in bladder 100 causes air to exit through the vent. In another embodiment, cartridge 16 does not include a vent in the cartridge housing 102 and relies on a vent included in a valve or connector 104 that provides fuel source communication into or out of the storage device. A filter may span the cross section of the vent and intercepts air passing through the vent.

FIG. 2B illustrates an exploded perspective view of a cartridge 150a in accordance with a specific embodiment of the present invention. FIG. 2C illustrates a cartridge 150b mechanically coupled to an exemplary portable fuel cell package 175. Either cartridge 150 may detachably couple to package 175.

Portable package 175 typically contains a portable fuel cell system, and includes a housing that holds and protects the fuel cell system components. The housing may also include latching and connection features for mechanical coupling to a cartridge. In one embodiment, the portable package refers to a package that includes a fuel cell system and weighs less than ten kilograms. Further description of a portable fuel cell system packages is described in commonly owned and co-pending patent application Ser. No. 11/120,643, which is incorporated by reference herein in its entirety for all purposes.

Referring to the exploded view of FIG. 2B, cartridge 150 includes a fluid transfer valve 156, a connection valve 158, an assembly housing 152, a main housing 154, one or more filters 160, mechanical interface components such as a slide interface 162, and a digital chip 164. Filter 160 was described above.

Housing assembly 152 attaches to main housing 154. Housing assembly 152 attaches to main housing 154; both housing portions provide mechanical protection for other components of cartridge 150. Housing assembly 152 also permits connectivity with a fuel cell device, supports and locates various components included in cartridge 150, and adds structural integrity to cartridge 150. Housing assembly 152 may include a molded and rigid plastic, for example. In one embodiment, housing assembly 152 surrounds main housing 154 and provides mechanical protection for main housing 154. In another embodiment, and as shown, assembly housing 152 only partially surrounds main housing 154 and main housing 154 includes its own walls that contain and mechanically protect an internal bladder and fuel. In this case, main housing 154 is substantially cylindrical. Other geometries for assembly housing 152 and main housing 154 may be used.

Housing assembly 152 includes one or more mechanical interface components that allow detachable coupling to a fuel cell package). As shown, assembly housing 152 includes a slide interface 162 that interfaces with a mating groove on fuel cell package 175. To couple cartridge 150 and package 175, slide interface 162 slides vertically (from the bottom) into a mating groove on the fuel cell package 175. The sliding interface permits a sliding relationship between the cartridge 150 and package 175.

A latching interface may be included to lock and hold cartridge 150 in one or more positions relative to package 175 along the sliding interface. The latching interface lets a user know (e.g. acoustically and kinesthetically) when the two are coupled together or at some desired position relative to each other.

Fluid transfer valve 156 opens to the inner bladder and permits fluidic communication with the bladder. As shown, fluid transfer valve 156 is disposed at one end of the cylindrical main housing 154. In one embodiment, fluid transfer valve 156 is a contact valve, which when depressed, permits flow of fuel from cartridge 150; and when not depressed, the contact valve prevents the flow of fuel from the cartridge. As shown, contact valve 156 outputs the fuel at about a 90-degree angle relative to fluid communication with a bladder included in main housing 154. In another embodiment, fluid transfer valve 156 outputs the fuel in an upward direction. Contact valves suitable for use with the present invention are available from a wide variety of vendors. Suitable commercially available valves are used in aerosol and shaving products, for example, and many are well suited for use herein.

In this case, fluid transfer valve 156 provides the fuel to a line 165 internal to assembly housing 152 that communicates the fuel to a connection valve 158. The connection valve 158 acts as a connector for cartridge 150 and interfaces with a downward facing mating connector on package 175. When assembly housing 152 couples to package 175, connection valve 158 permits transfer of fuel between cartridge 150 and package 175. Specifically, in this case, connection valve 158 communicates the fuel from line 165 to a mating connector and fuel line in package 175. The mating connector may be disposed on the fuel cell package 175, or another device such as a fuel cell, or a portion of an electronics device such as a laptop computer. In a specific embodiment, the cartridge assembly uses a commercially available contact valve or connection valve 158. One suitable connection valve that permits high pressure and uses contact to open and close fluid communication is a Schrader valve. Suitable commercially available Schrader valves are available from a wide variety of vendors. Other valves may be used. In addition, although connection valve 158 is shown pointing upwards, other orientations are possible.

Cartridges of the present invention may include one or more commercially available components. Using commercially available products allows the present invention to use mass produced, readily available, and proven technology. Off-the-shelf components may also reduce cost for a cartridge.

Aerosol cans, for example, are a proven technology suitable for use with housing 102 to store a hydrogen bearing fuel. Conventional aerosol containers also include a relatively high evacuation efficiency and may rely on commercially automated filling equipment. Other commercially available components suitable for use in a hydrogen fuel cartridge include those used in the shaving industry, those use in portable lighters, and those used for pressurized air and/or fuel delivery (e.g., to power a nail gun). These devices often include commercially available components suitable for use in a cartridge of the present invention such as: commercially available cartridge housings (also referred to as 'canisters' or 'cans'), bladders, commercially available heads (or 'mounting caps') that attach to the canisters, nozzles, and so on. Many commercially available nozzles include contact valves that permit binary fluid communication with/without contact. One suitable supplier of aerosol products including canisters and contact nozzles is Precision Valve, Inc. of Yonkers, N.Y.

In a specific embodiment, the cartridge housing includes commercially available aluminum components that crimp and seal together. For example, the housing may include a top aluminum head portion (also referred to as a 'mounting cup') that crimps to a cylindrical aluminum housing (also referred to as a 'can'). This advantageously seals the head to the cartridge housing. One or more components may be added internally to the aluminum cartridge housing before the seal is made. For example, a bladder may be added before the two parts are joined. The crimped connection then secures and seals the bladder.

A cartridge may also comprise one or more of the following materials: polycarbonate, ABS, PET, HDPE, or PCABS for housing 152; steel or aluminum or another suitably rigid metal or material for housing 154; tinplate/polypropylene/nylon for valve 156; and nylon or polypropylene for the bladder. Other materials may be used. The fuel cartridge may also include a commercially available 202 bag accessed using a commercially available aerosol valve. One of skill in the art is aware of the wide range of the aerosol can designs, bags and valves, and the fuel cartridge is not limited to any particular design.

In one embodiment, cartridge 150 includes a memory 164, which stores information relevant to usage of cartridge 150. Memory 164 may comprise a mechanical, electrical and/or digital mechanism for information storage. In one embodiment, memory 164 includes a digital memory source that permits a controller to read and write from the digital memory. In this case, cartridge 150 includes electrical connectivity for digital communication between memory 164 and a processor or controller on device 11.

Cartridge 150 is considered 'smart' when memory 164 stores information related to the performance, status and abilities of cartridge 150. A digital memory or chip allows an external controller or logic to read and write information relevant to usage of the cartridge 150 to memory 164. Reading from digital memory 106 allows reception and assessment of information in memory 106 to improve usage of cartridge 150. For example, a computer that receives storage device 150 may inform a user that the cartridge 150 is empty or how much fuel is left (or how much time on the system is available based on its power consumption and the amount of fuel remaining). Writing to a digital memory 164 allows information in the memory to be updated according to storage device 150 usage.

Cartridge 16b may also include other features such as a pressure relief valve that limits pressure in the bladder or cartridge, a fuel filter that intercepts fuel 17 as it leaves bladder 100 and before it leaves connector 104, a fire retardant foam disposed in bladder 100, and a wireless identification (ID) tag for memory 164, for example. These and other features suitable for use with a cartridge of the present invention are described in commonly owned and co-pending U.S. patent application Ser. No. 10/877,766 and entitled "PORTABLE FUEL CARTRIDGE FOR FUEL CELLS", which was incorporated by reference above.

Figure 10:
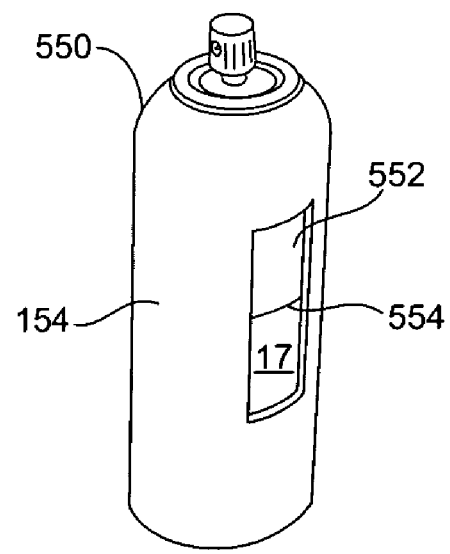
FIG. 10 shows a cartridge that includes a viewing window in accordance with a specific embodiment of the present invention.

In another embodiment, housing 102 comprises a viewing window that is configured to permit a user to see a current fuel level inside a fuel cartridge. FIG. 10 shows a cartridge 550 that includes a viewing window 552 in accordance with a specific embodiment of the present invention.

Viewing window 552 includes a transparent section or clear window in housing 154 that enables visual fuel gauging. Thus, a user may look through viewing window 552 and see the amount of fuel left in cartridge 550. Viewing window 552 includes a rigid and transparent polymer 554 disposed over a cut out, hole or aperture and housing 154.

In one embodiment, if fuel 17 comprises a colorless liquid, than a colorant may be added to the fuel to provide visual stimulus. Suitable colorants 154 include acid blue 9 at 1 ppm, table 5-4 food dye, and bright green/blue erioglaicine disodium salt as provided by Dudley Chemical Corp of Lakewood, N.J. The colorant also informs a person that the fuel 17 has leaked or escaped via a path other than the desired fuel path (e.g., colored fuel may be absorbed by absorbent 502 from FIG. 9, which then stains the absorbent material).

As described above, adding disposable components to a fuel cartridge as described herein improves performance for portable fuel cell system packages. Swapping in a new cartridge when fuel is replenished also refreshes any disposable components included on that cartridge.

The present invention also enables various business models for fuel cartridge sales and distribution. For example, a basic fuel cartridge may be sold with no added disposable components. An advanced fuel cartridge may include one or more disposable components. This permits product variability and pricing striation, and provides a consumer with fuel cartridge choice.

Also, different fuel cell systems and portable packages may require different cartridges. For example, a fuel cell system included in a laptop computer may require a first fuel cartridge, while a portable fuel cell system package used by the military employs a second fuel cartridge, where the disposable components included on the first and second fuel cartridges vary based on their intended and corresponding fuel cell system.

Figure 11:
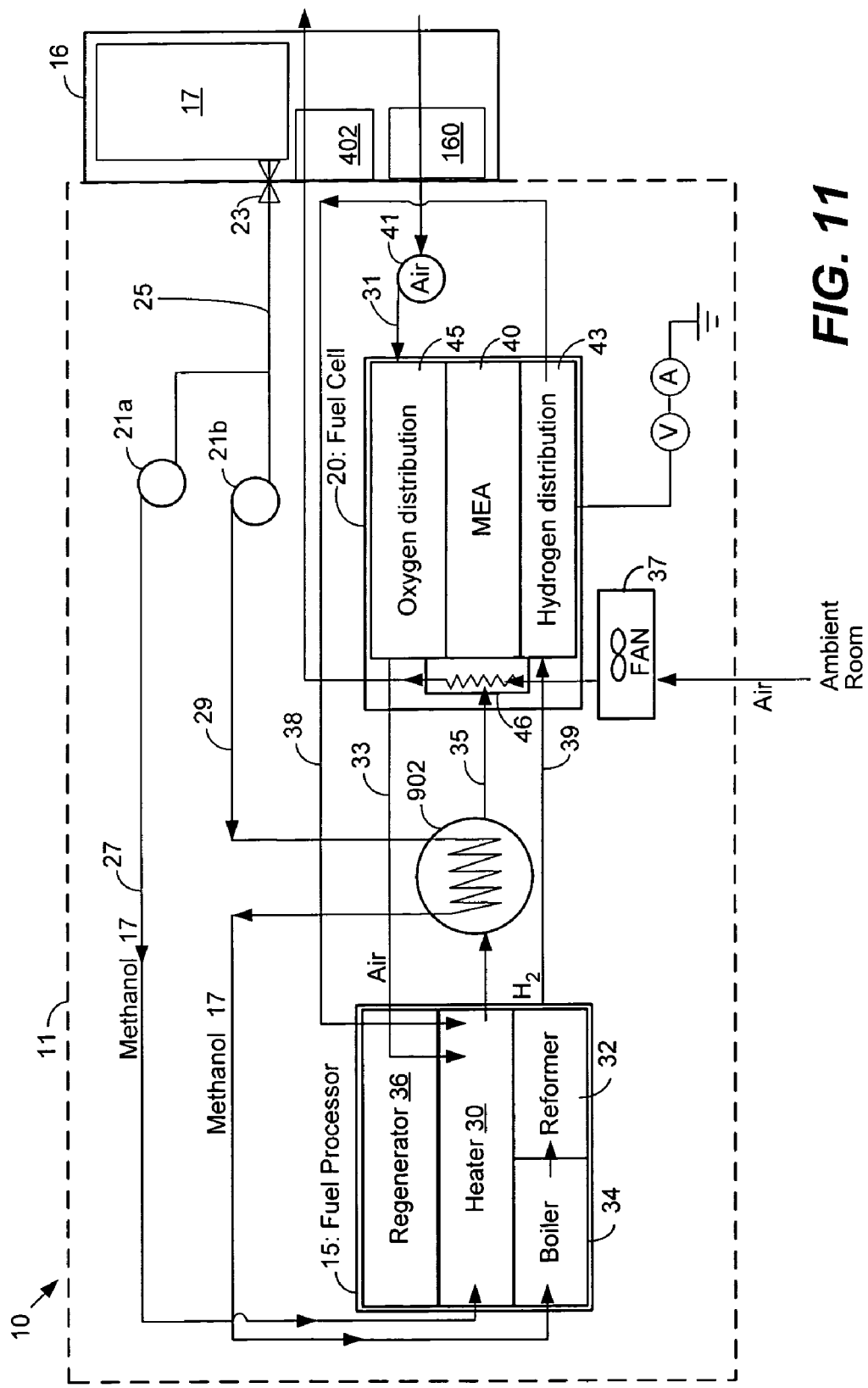
FIG. 11 illustrates a schematic operation for a fuel cell system in accordance with a specific embodiment of the present invention.

As mentioned above, the present invention is suitable for use with a wide variety of fuel cell systems. FIG. 11 illustrates a schematic operation for a fuel cell system 10 in accordance with a specific embodiment of the present invention.

Fuel cartridge 16 stores methanol or a methanol mixture as a hydrogen fuel 17. An outlet of cartridge 16 includes a connector 23 that mates with a mating connector on a package 11. In this case, the package 11 includes the fuel cell 20, fuel processor 15, and all other balance-of-plant components except the cartridge 16. In a specific embodiment, the connector 23 and mating connector form a quick connect/disconnect for easy replacement of cartridges 16. The mating connector communicates methanol 17 into hydrogen fuel line 25, which is internal to package 11 in this case.

Line 25 divides into two lines: a first line 27 that transports methanol 17 to a heater/heater 30 for fuel processor 15 and a second line 29 that transports methanol 17 for a reformer 32 in fuel processor 15. Lines 25, 27 and 29 may comprise channels disposed in the fuel processor (e.g., channels in metals components) and/or tubes leading thereto.

Flow control is provided on each line 27 and 29. Separate pumps 21a and 21b are provided for lines 27 and 29, respectively, to pressurize each line separately and transfer methanol at independent rates, if desired. A model 030SP-S6112 pump as provided by Biochem, N.J. is suitable to transmit liquid methanol on either line in a specific embodiment. A diaphragm or piezoelectric pump is also suitable for use with system 10. A flow restriction may also provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to heater 30 and reformer 32 on each line 27 and 29. In another specific embodiment shown, line 29 runs inlet methanol 17 across or through a heat exchanger (FIGS. 10A-10C) that receives heat from the exhaust of the heater 30 in fuel processor 15. This increases thermal efficiency for system 10 by preheating the incoming fuel (to reduce heating of the fuel in heater 30) and recuperates heat that would otherwise be expended from the system.

Air source 41 delivers oxygen and air from the ambient room through line 31 to the cathode in fuel cell 20, where some oxygen is used in the cathode to generate electricity. Air source 41 may include a pump, fan, blower or compressor, for example. High operating temperatures in fuel cell 20 also heat the oxygen and air.

In the embodiment shown, the heated oxygen and air is then transmitted from the fuel cell via line 33 to a regenerator 36 (also referred to herein as a 'dewar') of fuel processor 15, where the air is additionally heated (by the heater, while in the dewar) before entering heater 30. This double pre-heating increases efficiency of the fuel cell system 10 by a) reducing heat lost to reactants in heater 30 (such as fresh oxygen that would otherwise be near room temperature when combusted in the heater), and b) cooling the fuel cell during energy production. In this embodiment, a model BTC compressor as provided by Hargraves, N.C. is suitable to pressurize oxygen and air for fuel cell system 10.

A fan 37 blows cooling air (e.g., from the ambient room) over fuel cell 20. Fan 37 may be suitably sized to move air as desired by heating requirements of the fuel cell; and many vendors known to those of skill in the art provide fans suitable for use with package 10.

Fuel processor 15 receives methanol 17 and outputs hydrogen. Fuel processor 15 comprises heater 30, reformer 32, boiler 34 and regenerator 36. Heater 30 (also referred to herein as a burner when it uses catalytic combustion to generate heat) includes an inlet that receives methanol 17 from line 27. In a specific embodiment, the burner includes a catalyst that helps generate heat from methanol. In another embodiment, heater 30 also includes its own boiler to preheat fuel for the heater.

Boiler 34 includes a boiler chamber having an inlet that receives methanol 17 from line 29. The boiler chamber is configured to receive heat from heater 30, via heat conduction through walls in monolithic structure 100 between the boiler 34 and heater 30, and use the heat to boil the methanol passing through the boiler chamber. The structure of boiler 34 permits heat produced in heater 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Reformer 32 includes an inlet that receives heated methanol 17 from boiler 34. A catalyst in reformer 32 reacts with the methanol 17 to produce hydrogen and carbon dioxide; this reaction is endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium that is preferential to carbon monoxide over hydrogen.

Regenerator 36 pre-heats incoming air before the air enters heater 30. In one sense, regenerator 36 uses outward traveling waste heat in fuel processor 15 to increase thermal management and thermal efficiency of the fuel processor. Specifically, waste heat from heater 30 pre-heats incoming air provided to heater 30 to reduce heat transfer to the air within the heater. As a result, more heat transfers from the heater to reformer 32. The regenerator also functions as insulation for the fuel processor. More specifically, by reducing the overall amount of heat loss from the fuel processor, regenerator 36 also reduces heat loss from package 10 by heating air before the heat escapes fuel processor 15. This reduces heat loss from fuel processor 15, which enables cooler fuel cell system 10 packages.

Line 39 transports hydrogen (or 'reformate') from fuel processor 15 to fuel cell 20. In a specific embodiment, gaseous delivery lines 33, 35 and 39 include channels in a metal interconnect that couples to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels, and in one embodiment, delivers the gases to the ambient room.

In the embodiment shown, the anode exhaust is transferred back to fuel processor 15. In this case, system 10 comprises plumbing 38 that transports unused hydrogen from the anode exhaust to heater 30. For system 10, heater 30 includes two inlets: an inlet configured to receive fuel 17 and an inlet configured to receive hydrogen from line 38. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused hydrogen back to fuel processor 15.

In one embodiment, fuel cell 20 includes one or more heat transfer appendages 46 that permit conductive heat transfer with internal portions of a fuel cell stack. In one embodiment, heat transfer appendage 46 is integral with the substrate material in the bi-polar plate. Integral in this sense refers to material continuity between appendage 46 and bi-polar plate. An integrally formed appendage 46 may be formed with bi-polar plate in a single molding, stamping, machining or MEMs process of a single metal sheet, for example. Integrally forming appendage 46 and bi-polar plate permits conductive thermal communication and heat transfer between inner portions of bi-polar plate and the heat transfer appendage 46 via the substrate in the bi-polar plate. In a specific heating embodiment as shown, exhaust of heater 30 in fuel processor 15 is transported to the one or more heat transfer appendages 46 in fuel cell 20 during system start-up to expedite reaching initial elevated operating temperatures in the fuel cell 20. The heat may come from hot exhaust gases or unburned fuel in the exhaust, which then interacts with a catalyst disposed in proximity to a heat transfer appendage 46. In a specific cooling embodiment, an additional fan 37 blows cooling air over the one or more heat transfer appendages 46, which provides dedicated and controllable cooling of the stack during electrical energy production.

Recuperator 902 transfers heat from fuel cell system 10 to the inlet fuel 17 before the methanol reaches fuel processor 15. While system 10 shows recuperator 902 heating methanol in line 29 that carries fuel 17 to the boiler 34 and reformer 32, it is understood that recuperator 902 may be used to heat methanol in line 27 that carries fuel 17 to the burner 30.

Broadly speaking, recuperator 902 may include any device for transferring heat produced in fuel cell system 10 or a heated gas produced in fuel cell system 10 to the incoming fuel 17. Recuperator 902 may include one or more heat transfer channels for moving the incoming fuel 17, moving the heating medium, and one or more surfaces or structures for transferring heat from the heating medium to the incoming fuel 17. In one embodiment, recuperator 902 includes a commercially available heat exchanger. Recuperator 902 may rely on conductive heat transfer, convective heat transfer, and combinations thereof.

In one embodiment, the heat used to warm fuel 17 comes from a fluid in fuel cell system 10. Fluids (a gas or liquid) suitable for use in this manner include: the cathode exhaust from fuel cell 20 in line 33, the reformer 32 exhaust from fuel processor 15, the burner 34 exhaust from fuel processor 15 in line 35, the anode exhaust from fuel cell 20 in line 38, or combinations thereof. Fuel cell 20 and fuel processor 15 both run at elevated temperatures during steady-state operation. Any fluids emitted from fuel cell 20 and fuel processor 15 will also be at elevated temperatures and are suitable for heat transfer to the incoming fuel.

As mentioned before, incoming fuel to a reformer 32 in fuel processor 15 is vaporized before processing by a reforming catalyst in the fuel processor. Similarly, incoming methanol to burner 30 is vaporized before meeting the burner catalyst. The fuel 17 typically enters the fuel cell package at its storage temperature in storage device 16, which is normally cooler than the operating temperatures of fuel cell 20 and fuel processor 15, or fluids emitted from these devices. Any heat transferred to fuel 17 before vaporization in fuel processor 15 reduces the amount of energy that the heater in fuel processor 15 supplies to the fuel 17. This increases efficiency by i) leaving more heat for the reformer and catalytic production of hydrogen and/or ii) consuming less fuel to heat fuel processor 15. This also reduces the burner exhaust temperature leaving the package. For an electrical heater that vaporizes the incoming methanol, this reduces electrical energy used by the electrical heater to vaporize the incoming fuel.

In addition to the components shown in shown in FIG. 1, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 11 shows one specific plumbing arrangement for a fuel cell system; other plumbing arrangements are suitable for use herein. For example, the heat transfer appendages 46, a heat exchanger and dewar 36 need not be included. Other alterations to system 10 are permissible, as one of skill in the art will appreciate.

While this invention has been described in terms of several preferred embodiments, there are alterations, permutations, and equivalents that fall within the scope of this invention which have been omitted for brevity's sake. It is therefore intended that the scope of the invention should be determined with reference to the appended claims.

What is claimed is:

1. A portable fuel cartridge for storing a fuel for use in a portable device having a portable fuel cell system, the portable fuel cartridge comprising:

an elongated housing having a length and a width, wherein the length is substantially larger than the width;

a volume internal to the housing for storing the fuel;

an elongated mechanical connector coupled to the housing that extends along the elongated length side of the housing, the mechanical connector being configured suitably to facilitate fastening the housing to an outside wall of the portable device along a length of the connector such that the fuel cartridge is positioned external to the portable device along a side of the portable device and is not received within the portable device;

a fuel connector configured to permit transfer of the fuel between the internal volume and the portable fuel cell system; and an air filter distinct from the elongated mechanical connector, proximate to the mechanical connector and mechanically coupled to the housing, configured to intercept cooling air before the portable device receives the air, wherein the portable fuel cartridge is configured to guide air intended for delivery to the portable device through the air filter and through the connector such that filtered air is delivered to the portable device.

2. The cartridge of claim 1 further comprising a plurality of intake vents disposed along the length of the housing that permit air passage through a wall in the housing before passage through the air filter, such that the air flows into the plurality of vents in the housing and flows through the filter and the mechanical connector before entering the portable device.

3. The cartridge of claim 1 wherein the cartridge further comprises an outer assembly attached to the housing and configured to support the air filter and the housing, wherein the outer assembly has an elongated shape with a length and a width, wherein the outer assembly length is substantially larger than the outer assembly width, wherein the outer assembly includes a plurality of intake vents disposed along the length of the outer assembly, the plurality of vents being arranged such that the air enters the plurality of vents and flows through the filter and through the mechanical connector before entering the portable device.

4. The cartridge of claim 1 wherein the air filter is disposed on a side of the portable cartridge that faces the portable device when the portable cartridge couples to the portable device, such that the cooling air is drawn from a region substantially between the portable device and the cartridge.

5. The cartridge of claim 1 further comprising a hydrophobic filter configured to prevent the passage of water through the hydrophobic filter.

6. The cartridge of claim 5 wherein the hydrophobic filter is disposed adjacent to the air filter to prevent water from passing through the air filter.

7. The cartridge of claim 1 wherein the air filter is also a hydrophobic filter that is configured to prevent the passage of water through the hydrophobic filter.

8. The cartridge of claim 1 wherein the portable fuel cell system includes a fuel processor configured to process the fuel and output hydrogen, and wherein the air filter is selected to intercept a particulate or contaminant that will react with a catalyst or block a fluidic path in the fuel processor.

9. The cartridge of claim 1 further comprising a sensor disposed along the inlet airflow of the cartridge to detect one or more properties of the inlet air.

10. The cartridge of claim 9 wherein the sensor is selected to detect carbon monoxide.

11. The cartridge of claim 1 further including a pressure source, internal to the portable device, that is configured to apply a negative pressure to the air filter on the cartridge to draw air through the air filter.

12. The cartridge of claim 1 wherein the air filter is directly and mechanically coupled to the housing.

13. The cartridge of claim 1 wherein the mechanical connector is a slide interface that interfaces with a mating groove on the portable device.

14. A portable fuel cell system for producing electrical energy, the fuel cell system comprising:

a portable device that includes a fuel cell; and an elongated portable fuel cartridge having a length and a width, wherein the length is substantially larger than the width, said elongated portable fuel cartridge including an elongated housing, a volume internal to the housing for storing a fuel, an elongated mechanical connector coupled to the housing that extends along an elongated side of the housing, the mechanical connector being configured suitably to fasten the housing to an outside wall of the portable device along a length of the connector such that the fuel cartridge is positioned external to the portable device along a side of the portable device;

a fuel connector configured to permit transfer of the fuel between the internal volume and the portable fuel cell system, and an air filter, distinct from the elongated mechanical connector, configured to intercept air before the portable device receives the air, wherein the portable fuel cartridge is configured to guide air intended for delivery to the portable device through a plurality of intake vents disposed along the length of the elongated portable fuel cartridge, and thereafter through the air filter and through the connector such that filtered air is delivered to the portable device, and wherein the portable device includes air channels that are configured to guide cooling air over external portions of the fuel cell.

15. The portable fuel cell system of claim 14 further including an air source, internal to the portable device, configured to draw air through the air filter on the portable fuel cartridge.

16. The portable fuel cell system of claim 14 wherein filtered air output by the air filter is provided into the fuel cell for electrochemical energy generation in the fuel cell.

17. The portable fuel cell system of claim 14 further comprising one or more fans or blowers configured to cool the fuel cell using filtered air output by the air filter.

18. The portable fuel cell system of claim 14 further including a second air filter, included with the portable device that is configured to intercept filtered air output from the air filter on the cartridge before the filtered air flows internal to the portable device.

19. The portable fuel cell system of claim 14 further including a pressure source, internal to the portable device, that is configured to apply a negative pressure to the air filter on the cartridge to draw air through the air filter.

20. The portable fuel cell system of claim 14 wherein the portable fuel cell system includes a fuel processor configured to receive the fuel, process the fuel, and output hydrogen.

21. The portable fuel cell system of claim 20 wherein the filtered air is provided into the fuel processor for catalytic processing of the fuel.

22. The portable fuel cell system of claim 21 further comprising a regenerator configured to heat the filtered air before the fuel processor receives the filtered air.

23. The portable fuel cell system of claim 14 further comprising a sensor disposed along the inlet airflow to detect one or more properties of the inlet air.

24. The portable fuel cell system of claim 23 wherein the sensor is selected to detect carbon monoxide.

25. A portable fuel cell system for producing electrical energy, the fuel cell system comprising:

a portable device that includes a fuel cell having:

at least one heat transfer appendage at least partially arranged external to the fuel cell; and an elongated portable fuel cartridge having a length and a width, wherein the length is substantially larger than the width, said elongated portable cartridge including an elongated housing having a length and a width, wherein the length is substantially larger than the width, a volume internal to the housing for storing a fuel, an elongated mechanical connector coupled to the housing that extends along the elongated length side of the housing, the mechanical connector being configured suitably to fasten the housing to an outside wall of the portable device along a length of the connector such that the fuel cartridge is positioned external to the portable device along a side of the portable device;

a fuel connector configured to permit transfer of the fuel between the internal volume and the portable device, and an air filter distinct from the elongated mechanical connector configured to intercept cooling air before the portable device receives the air, wherein the portable fuel cartridge is configured to guide air through the air filter of the cartridge and through the outside wall of the portable device, and wherein the portable device includes air channels configured to guide cooling air over the heat transfer appendage of the fuel cell.

26. The portable fuel cell system of claim 25 further comprising:

a plurality of vents disposed along the length of the elongated portable fuel cartridge that permit air passage through a wall in the housing before passage through the air filter;

an outer assembly attached to the housing and configured to support the air filter and the housing, wherein the outer assembly has an elongated shape with a length and a width, wherein the outer assembly length is substantially larger than the outer assembly width, wherein a plurality of intake vents are included in the outer assembly the plurality of intake vents being disposed along the length axis of the outer assembly and arranged such that the cooling air enters the plurality of outer assembly intake vents and flows through the filter and the elongated mechanical connector before entering the portable device.

27. The portable fuel cell system of claim 25 wherein the air filter is also a hydrophobic filter that is configured to prevent the passage of water through the hydrophobic filter.

28. The portable fuel cell system of claim 25 wherein the portable fuel cell system includes a fuel processor configured to process the fuel and output hydrogen, and wherein the air filter is selected to intercept a particulate or contaminant that will react with a catalyst or block a fluidic path in the fuel processor.

29. The portable fuel cell system of claim 25 wherein the mechanical connector is a slide interface that interfaces with a mating groove on the portable device.

30. A portable fuel cell system for producing electrical energy, the fuel cell system comprising:

a portable device that includes a fuel cell including a fuel cell stack that is configured to produce electrical energy using hydrogen output by a fuel processor, the fuel cell stack includes a set of bi-polar plates and a set of membrane electrode assembly layers, where each bi-polar plate in the stack comprises i) a substrate, and ii) at least one heat transfer appendage in material continuity with the substrate and at least partially arranged external to the fuel cell stack, wherein the heat transfer appendage and substrate are formed from a single sheet of material; and an elongated portable fuel cartridge having a length and a width, wherein the length is substantially larger than the width, said elongated portable fuel cartridge including an elongated housing having a length and a width, wherein the length is substantially larger than the width, a volume internal to the housing for storing a fuel, an elongated mechanical connector coupled to the housing that extends along the elongated length side of the housing, the mechanical connector being configured suitably to fasten the housing to an outside wall of the portable device along a length of the connector such that the fuel cartridge is positioned external to the portable device along a side of the portable device;

a fuel connector configured to permit transfer of the fuel between the internal volume and the portable device, and an air filter distinct from the elongated mechanical connector configured to intercept cooling air before the portable device receives the air, wherein the portable fuel cartridge is configured to guide air through a plurality of intake vents disposed along the length of the elongated portable fuel cartridge, and thereafter through the air filter and into the portable device, and wherein the portable device is configured to guide cooling air over the heat transfer appendages of the fuel cell.

31. The portable fuel cell system of claim 30 further including an air source, internal to the portable device, configured to draw air through the air filter on the portable fuel cartridge.

32. The portable fuel cell system of claim 30 further including a second air filter, included with the portable device that is configured to intercept filtered air output from the air filter on the cartridge before the filtered air flows into the portable device.

* * * * *

UNITED STATES PATENT AND TRADEMARK OFFICE
CERTIFICATE OF CORRECTION

PATENT NO. : 7,648,792 B2
APPLICATION NO. : 11/416785
DATED : January 19, 2010
INVENTOR(S) : Kaschmitter et al.

It is certified that error appears in the above-identified patent and that said Letters Patent is hereby corrected as shown below:

On the Title Page of the Patent:

Please delete    "(63) Continuation-in-Part of application No. 10/877,766, filed on Jun. 25, 2004.".

In the Specification:

Col. 15, line 37,   change "Dessicant" to --Desiccant--.

Col. 17, line 42,   change "Polyethelyne" to --Polyethylene--.

Col. 18, lines 51-52,   change "polypropelene" to --polypropylene--.

Col. 19, line 22,   change "refiner" to --refiller--.

Col. 23, line 51,   after "may also" insert --be--.

Signed and Sealed this

Eleventh Day of May, 2010

David J. Kappos
*Director of the United States Patent and Trademark Office*